US010789535B2

(12) United States Patent
Raichelgauz et al.

(10) Patent No.: US 10,789,535 B2
(45) Date of Patent: Sep. 29, 2020

(54) DETECTION OF ROAD ELEMENTS

(71) Applicant: CARTICA AI LTD, Tel Aviv (IL)

(72) Inventors: Igal Raichelgauz, Tel Aviv (IL); Karina Odinaev, Tel Aviv (IL); Yehoshua Y Zeevi, Haifa (IL)

(73) Assignee: CARTICA AI LTD, Tel Aviv (IL)

( * ) Notice: Subject to any disclaimer, the term of this patent is extended or adjusted under 35 U.S.C. 154(b) by 0 days.

(21) Appl. No.: 16/669,786

(22) Filed: Oct. 31, 2019

(65) Prior Publication Data

US 2020/0167672 A1  May 28, 2020

Related U.S. Application Data

(60) Provisional application No. 62/771,323, filed on Nov. 26, 2018.

(51) Int. Cl.
| | |
|---|---|
| *G06N 5/04* | (2006.01) |
| *G06N 20/00* | (2019.01) |
| *G06F 16/907* | (2019.01) |
| *H04L 29/08* | (2006.01) |
| *G05D 1/00* | (2006.01) |
| *G06F 16/23* | (2019.01) |

(52) U.S. Cl.
CPC ............ *G06N 5/04* (2013.01); *G05D 1/0088* (2013.01); *G06F 16/23* (2019.01); *G06F 16/907* (2019.01); *G06N 20/00* (2019.01); *H04L 67/12* (2013.01); *G05D 2201/0213* (2013.01)

(58) Field of Classification Search
CPC ............................................. G05D 2201/0213
See application file for complete search history.

(56) References Cited

U.S. PATENT DOCUMENTS

| | | |
|---|---|---|
| 4,733,353 A | 3/1988 | Jaswa |
| 4,932,645 A | 6/1990 | Schorey et al. |
| | (Continued) | |

FOREIGN PATENT DOCUMENTS

| | | | |
|---|---|---|---|
| EP | 1085464 A3 | 1/2007 | |
| EP | 3093620 A1 * | 11/2016 | ............. G01C 21/26 |
| | (Continued) | | |

OTHER PUBLICATIONS

Chen, Tiffany Yu-Han, et al. "Glimpse: Continuous, real-time object recognition on mobile devices." Proceedings of the 13th ACM Conference on Embedded Networked Sensor Systems. 2015. (Year: 2015).*

(Continued)

*Primary Examiner* — Hal Schnee
(74) *Attorney, Agent, or Firm* — Reches Patent

(57) ABSTRACT

A method for detecting road elements that may include (a) detecting predefined identifiers of road elements, in road related information sensed by vehicles; (b) detecting potential identifiers of road elements that differ from the predefined identifiers of road elements, by processing road related information that was acquired by the vehicles during relevant time windows that are related to the detecting of the predefined identifiers; (c) finding actual identifiers of road elements out of the potential identifiers; wherein the findings is based, at least in part, on road related information that was acquired by the vehicles outside the relevant time windows; and (d) updating a database with the actual identifiers.

29 Claims, 9 Drawing Sheets

(56) References Cited

U.S. PATENT DOCUMENTS

| | | |
|---|---|---|
| 4,972,363 A | 11/1990 | Nguyen et al. |
| 5,078,501 A | 1/1992 | Hekker et al. |
| 5,214,746 A | 5/1993 | Fogel et al. |
| 5,307,451 A | 4/1994 | Clark |
| 5,412,564 A | 5/1995 | Ecer |
| 5,436,653 A | 7/1995 | Ellis et al. |
| 5,568,181 A | 10/1996 | Greenwood et al. |
| 5,638,425 A | 6/1997 | Meador et al. |
| 5,745,678 A | 4/1998 | Herzberg et al. |
| 5,754,938 A | 5/1998 | Herz et al. |
| 5,763,069 A | 6/1998 | Jordan |
| 5,806,061 A | 9/1998 | Chaudhuri et al. |
| 5,835,087 A | 11/1998 | Herz et al. |
| 5,835,901 A | 11/1998 | Duvoisin et al. |
| 5,852,435 A | 12/1998 | Vigneaux et al. |
| 5,870,754 A | 2/1999 | Dimitrova et al. |
| 5,873,080 A | 2/1999 | Coden et al. |
| 5,887,193 A | 3/1999 | Takahashi et al. |
| 5,926,812 A | 7/1999 | Hilsenrath et al. |
| 5,978,754 A | 11/1999 | Kumano |
| 5,991,306 A | 11/1999 | Burns et al. |
| 6,052,481 A | 4/2000 | Grajski et al. |
| 6,070,167 A | 5/2000 | Qian et al. |
| 6,076,088 A | 6/2000 | Paik et al. |
| 6,122,628 A | 9/2000 | Castelli et al. |
| 6,128,651 A | 10/2000 | Cezar |
| 6,137,911 A | 10/2000 | Zhilyaev |
| 6,144,767 A | 11/2000 | Bottou et al. |
| 6,147,636 A | 11/2000 | Gershenson |
| 6,163,510 A | 12/2000 | Lee et al. |
| 6,243,375 B1 | 6/2001 | Speicher |
| 6,243,713 B1 | 6/2001 | Nelson et al. |
| 6,275,599 B1 | 8/2001 | Adler et al. |
| 6,314,419 B1 | 11/2001 | Faisal |
| 6,329,986 B1 | 12/2001 | Cheng |
| 6,381,656 B1 | 4/2002 | Shankman |
| 6,411,229 B2 | 6/2002 | Kobayashi |
| 6,422,617 B1 | 7/2002 | Fukumoto et al. |
| 6,507,672 B1 | 1/2003 | Watkins et al. |
| 6,523,046 B2 | 2/2003 | Liu et al. |
| 6,524,861 B1 | 2/2003 | Anderson |
| 6,546,405 B2 | 4/2003 | Gupta et al. |
| 6,550,018 B1 | 4/2003 | Abonamah et al. |
| 6,557,042 B1 | 4/2003 | He et al. |
| 6,594,699 B1 | 7/2003 | Sahai et al. |
| 6,601,026 B2 | 7/2003 | Appelt et al. |
| 6,611,628 B1 | 8/2003 | Sekiguchi et al. |
| 6,618,711 B1 | 9/2003 | Ananth |
| 6,640,015 B1 | 10/2003 | Lafruit |
| 6,643,620 B1 | 11/2003 | Contolini et al. |
| 6,643,643 B1 | 11/2003 | Lee et al. |
| 6,665,657 B1 | 12/2003 | Dibachi |
| 6,681,032 B2 | 1/2004 | Bortolussi et al. |
| 6,704,725 B1 | 3/2004 | Lee |
| 6,732,149 B1 | 5/2004 | Kephart |
| 6,742,094 B2 | 5/2004 | Igari |
| 6,751,363 B1 | 6/2004 | Natsev et al. |
| 6,751,613 B1 | 6/2004 | Lee et al. |
| 6,754,435 B2 | 6/2004 | Kim |
| 6,763,069 B1 | 7/2004 | Divakaran et al. |
| 6,763,519 B1 | 7/2004 | McColl et al. |
| 6,774,917 B1 | 8/2004 | Foote et al. |
| 6,795,818 B1 | 9/2004 | Lee |
| 6,804,356 B1 | 10/2004 | Krishnamachari |
| 6,813,395 B1 | 11/2004 | Kinjo |
| 6,819,797 B1 | 11/2004 | Smith et al. |
| 6,877,134 B1 | 4/2005 | Fuller et al. |
| 6,901,207 B1 | 5/2005 | Watkins |
| 6,938,025 B1 | 8/2005 | Lulich et al. |
| 6,985,172 B1 | 1/2006 | Rigney et al. |
| 7,013,051 B2 | 3/2006 | Sekiguchi et al. |
| 7,020,654 B1 | 3/2006 | Najmi |
| 7,023,979 B1 | 4/2006 | Wu et al. |
| 7,043,473 B1 | 5/2006 | Rassool et al. |
| 7,158,681 B2 | 1/2007 | Persiantsev |
| 7,215,828 B2 | 5/2007 | Luo |
| 7,260,564 B1 | 8/2007 | Lynn et al. |
| 7,289,643 B2 | 10/2007 | Brunk et al. |
| 7,299,261 B1 | 11/2007 | Oliver et al. |
| 7,302,089 B1 | 11/2007 | Smits |
| 7,302,117 B2 | 11/2007 | Sekiguchi et al. |
| 7,313,805 B1 | 12/2007 | Rosin et al. |
| 7,340,358 B2 | 3/2008 | Yoneyama |
| 7,346,629 B2 | 3/2008 | Kapur et al. |
| 7,353,224 B2 | 4/2008 | Chen et al. |
| 7,376,672 B2 | 5/2008 | Weare |
| 7,383,179 B2 | 6/2008 | Alves et al. |
| 7,433,895 B2 | 10/2008 | Li et al. |
| 7,464,086 B2 | 12/2008 | Black et al. |
| 7,529,659 B2 | 5/2009 | Wold |
| 7,657,100 B2 | 2/2010 | Gokturk et al. |
| 7,660,468 B2 | 2/2010 | Gokturk et al. |
| 7,801,893 B2 | 9/2010 | Gulli |
| 7,805,446 B2 | 9/2010 | Potok et al. |
| 7,860,895 B1 | 12/2010 | Scofield et al. |
| 7,872,669 B2 | 1/2011 | Darrell et al. |
| 7,921,288 B1 | 4/2011 | Hildebrand |
| 7,933,407 B2 | 4/2011 | Keidar et al. |
| 8,023,739 B2 | 9/2011 | Hohimer et al. |
| 8,266,185 B2 | 9/2012 | Raichelgauz et al. |
| 8,275,764 B2 | 9/2012 | Jeon |
| 8,285,718 B1 | 10/2012 | Ong et al. |
| 8,312,031 B2 | 11/2012 | Raichelgauz et al. |
| 8,315,442 B2 | 11/2012 | Gokturk et al. |
| 8,345,982 B2 | 1/2013 | Gokturk et al. |
| 8,386,400 B2 | 2/2013 | Raichelgauz et al. |
| 8,396,876 B2 | 3/2013 | Kennedy et al. |
| 8,418,206 B2 | 4/2013 | Bryant et al. |
| RE44,225 E | 5/2013 | Aviv |
| 8,442,321 B1 | 5/2013 | Chang et al. |
| 8,457,827 B1 | 6/2013 | Ferguson et al. |
| 8,495,489 B1 | 7/2013 | Everingham |
| 8,527,978 B1 | 9/2013 | Sallam |
| 8,634,980 B1 | 1/2014 | Urmson |
| 8,635,531 B2 | 1/2014 | Graham et al. |
| 8,655,801 B2 | 2/2014 | Raichelgauz et al. |
| 8,655,878 B1 | 2/2014 | Kulkarni et al. |
| 8,781,152 B2 | 7/2014 | Momeyer |
| 8,782,077 B1 | 7/2014 | Rowley |
| 8,799,195 B2 | 8/2014 | Raichelgauz et al. |
| 8,799,196 B2 | 8/2014 | Raichelquaz et al. |
| 8,818,916 B2 | 8/2014 | Raichelgauz et al. |
| 8,868,861 B2 | 10/2014 | Shimizu et al. |
| 8,886,648 B1 | 11/2014 | Procopio et al. |
| 8,954,887 B1 | 2/2015 | Tseng et al. |
| 8,990,199 B1 | 3/2015 | Ramesh et al. |
| 9,009,086 B2 | 4/2015 | Raichelgauz et al. |
| 9,104,747 B2 | 8/2015 | Raichelgauz et al. |
| 9,165,406 B1 | 10/2015 | Gray et al. |
| 9,298,763 B1 | 3/2016 | Zack |
| 9,311,308 B2 | 4/2016 | Sankarasubramaniam et al. |
| 9,323,754 B2 | 4/2016 | Ramanathan et al. |
| 9,440,647 B1 * | 9/2016 | Sucan ............ B60W 30/18154 |
| 9,466,068 B2 | 10/2016 | Raichelgauz et al. |
| 9,646,006 B2 | 5/2017 | Raichelgauz et al. |
| 9,679,062 B2 | 6/2017 | Schillings et al. |
| 9,734,533 B1 | 8/2017 | Givot |
| 9,807,442 B2 | 10/2017 | Bhatia et al. |
| 9,875,445 B2 | 1/2018 | Amer et al. |
| 9,984,369 B2 | 5/2018 | Li et al. |
| 10,133,947 B2 | 11/2018 | Yang |
| 10,347,122 B2 | 7/2019 | Takenaka |
| 10,491,885 B1 | 11/2019 | Hicks |
| 2001/0019633 A1 | 9/2001 | Tenze et al. |
| 2001/0034219 A1 | 10/2001 | Hewitt et al. |
| 2001/0038876 A1 | 11/2001 | Anderson |
| 2002/0004743 A1 | 1/2002 | Kutaragi et al. |
| 2002/0010682 A1 | 1/2002 | Johnson |
| 2002/0010715 A1 | 1/2002 | Chinn et al. |
| 2002/0019881 A1 | 2/2002 | Bokhari et al. |
| 2002/0032677 A1 | 3/2002 | Morgenthaler et al. |
| 2002/0038299 A1 | 3/2002 | Zernik et al. |
| 2002/0042914 A1 | 4/2002 | Walker et al. |
| 2002/0072935 A1 | 6/2002 | Rowse et al. |

(56) References Cited

U.S. PATENT DOCUMENTS

| | | |
|---|---|---|
| 2002/0087530 A1 | 7/2002 | Smith et al. |
| 2002/0087828 A1 | 7/2002 | Arimilli et al. |
| 2002/0091947 A1 | 7/2002 | Nakamura |
| 2002/0107827 A1 | 8/2002 | Benitez-Jimenez et al. |
| 2002/0113812 A1 | 8/2002 | Walker et al. |
| 2002/0126002 A1 | 9/2002 | Patchell |
| 2002/0126872 A1 | 9/2002 | Brunk et al. |
| 2002/0129140 A1 | 9/2002 | Peled et al. |
| 2002/0147637 A1 | 10/2002 | Kraft et al. |
| 2002/0157116 A1 | 10/2002 | Jasinschi |
| 2002/0163532 A1 | 11/2002 | Thomas et al. |
| 2002/0174095 A1 | 11/2002 | Lulich et al. |
| 2002/0184505 A1 | 12/2002 | Mihcak et al. |
| 2003/0004966 A1 | 1/2003 | Bolle et al. |
| 2003/0005432 A1 | 1/2003 | Ellis et al. |
| 2003/0037010 A1 | 2/2003 | Schmelzer |
| 2003/0041047 A1 | 2/2003 | Chang et al. |
| 2003/0089216 A1 | 5/2003 | Birmingham et al. |
| 2003/0093790 A1 | 5/2003 | Logan et al. |
| 2003/0101150 A1 | 5/2003 | Agnihotri et al. |
| 2003/0105739 A1 | 6/2003 | Essafi et al. |
| 2003/0110236 A1 | 6/2003 | Yang et al. |
| 2003/0115191 A1 | 6/2003 | Copperman et al. |
| 2003/0126147 A1 | 7/2003 | Essafi et al. |
| 2003/0140257 A1 | 7/2003 | Peterka et al. |
| 2003/0165269 A1 | 9/2003 | Fedorovskaya et al. |
| 2003/0174859 A1 | 9/2003 | Kim |
| 2003/0184598 A1 | 10/2003 | Graham |
| 2003/0200217 A1 | 10/2003 | Ackerman |
| 2003/0217335 A1 | 11/2003 | Chung et al. |
| 2003/0229531 A1 | 12/2003 | Heckerman et al. |
| 2004/0059736 A1 | 3/2004 | Willse |
| 2004/0091111 A1 | 5/2004 | Levy |
| 2004/0095376 A1 | 5/2004 | Graham et al. |
| 2004/0098671 A1 | 5/2004 | Graham et al. |
| 2004/0111432 A1 | 6/2004 | Adams et al. |
| 2004/0117638 A1 | 6/2004 | Monroe |
| 2004/0128511 A1 | 7/2004 | Sun et al. |
| 2004/0153426 A1 | 8/2004 | Nugent |
| 2004/0162820 A1 | 8/2004 | James et al. |
| 2004/0230572 A1 | 11/2004 | Omoigui |
| 2004/0267774 A1 | 12/2004 | Lin et al. |
| 2005/0021394 A1 | 1/2005 | Miedema et al. |
| 2005/0080788 A1 | 4/2005 | Murata |
| 2005/0114198 A1 | 5/2005 | Koningstein et al. |
| 2005/0131884 A1 | 6/2005 | Gross et al. |
| 2005/0163375 A1 | 7/2005 | Grady |
| 2005/0172130 A1 | 8/2005 | Roberts |
| 2005/0177372 A1 | 8/2005 | Wang et al. |
| 2005/0193015 A1 | 9/2005 | Logston |
| 2005/0226511 A1 | 10/2005 | Short |
| 2005/0238198 A1 | 10/2005 | Brown et al. |
| 2005/0238238 A1 | 10/2005 | Xu et al. |
| 2005/0249398 A1 | 11/2005 | Khamene et al. |
| 2005/0256820 A1 | 11/2005 | Dugan et al. |
| 2005/0262428 A1 | 11/2005 | Little et al. |
| 2005/0281439 A1 | 12/2005 | Lange |
| 2005/0289163 A1 | 12/2005 | Gordon et al. |
| 2005/0289590 A1 | 12/2005 | Cheok et al. |
| 2006/0004745 A1 | 1/2006 | Kuhn et al. |
| 2006/0015580 A1 | 1/2006 | Gabriel et al. |
| 2006/0020958 A1 | 1/2006 | Allamanche et al. |
| 2006/0033163 A1 | 2/2006 | Chen |
| 2006/0050993 A1 | 3/2006 | Stentiford |
| 2006/0069668 A1 | 3/2006 | Braddy et al. |
| 2006/0080311 A1 | 4/2006 | Potok et al. |
| 2006/0100987 A1 | 5/2006 | Leurs |
| 2006/0112035 A1 | 5/2006 | Cecchi et al. |
| 2006/0120626 A1 | 6/2006 | Perlmutter |
| 2006/0129822 A1 | 6/2006 | Snijder et al. |
| 2006/0217818 A1 | 9/2006 | Fujiwara |
| 2006/0217828 A1 | 9/2006 | Hicken |
| 2006/0218191 A1 | 9/2006 | Gopalakrishnan |
| 2006/0224529 A1 | 10/2006 | Kermani |
| 2006/0236343 A1 | 10/2006 | Chang |
| 2006/0242130 A1 | 10/2006 | Sadri et al. |
| 2006/0248558 A1 | 11/2006 | Barton et al. |
| 2006/0251338 A1 | 11/2006 | Gokturk et al. |
| 2006/0251339 A1 | 11/2006 | Gokturk |
| 2006/0253423 A1 | 11/2006 | McLane et al. |
| 2006/0288002 A1 | 12/2006 | Epstein et al. |
| 2007/0022374 A1 | 1/2007 | Huang et al. |
| 2007/0033170 A1 | 2/2007 | Sull et al. |
| 2007/0038614 A1 | 2/2007 | Guha |
| 2007/0042757 A1 | 2/2007 | Jung et al. |
| 2007/0061302 A1 | 3/2007 | Ramer et al. |
| 2007/0067304 A1 | 3/2007 | Ives |
| 2007/0074147 A1 | 3/2007 | Wold |
| 2007/0083611 A1 | 4/2007 | Farago et al. |
| 2007/0091106 A1 | 4/2007 | Moroney |
| 2007/0130159 A1 | 6/2007 | Gulli et al. |
| 2007/0136782 A1 | 6/2007 | Ramaswamy et al. |
| 2007/0156720 A1 | 7/2007 | Maren |
| 2007/0196013 A1 | 8/2007 | Li |
| 2007/0244902 A1 | 10/2007 | Seide et al. |
| 2007/0253594 A1 | 11/2007 | Lu et al. |
| 2007/0298152 A1 | 12/2007 | Baets |
| 2008/0049789 A1 | 2/2008 | Vedantham et al. |
| 2008/0072256 A1 | 3/2008 | Boicey et al. |
| 2008/0079729 A1 | 4/2008 | Brailovsky |
| 2008/0109433 A1 | 5/2008 | Rose |
| 2008/0152231 A1 | 6/2008 | Gokturk |
| 2008/0159622 A1 | 7/2008 | Agnihotri et al. |
| 2008/0165861 A1 | 7/2008 | Wen et al. |
| 2008/0166020 A1 | 7/2008 | Kosaka |
| 2008/0201299 A1 | 8/2008 | Lehikoinen et al. |
| 2008/0201314 A1 | 8/2008 | Smith et al. |
| 2008/0201361 A1 | 8/2008 | Castro et al. |
| 2008/0228995 A1 | 9/2008 | Tan et al. |
| 2008/0237359 A1 | 10/2008 | Silverbrook et al. |
| 2008/0247543 A1 | 10/2008 | Mick et al. |
| 2008/0253737 A1 | 10/2008 | Kimura et al. |
| 2008/0263579 A1 | 10/2008 | Mears et al. |
| 2008/0270373 A1 | 10/2008 | Oostveen et al. |
| 2008/0270569 A1 | 10/2008 | McBride |
| 2008/0294278 A1 | 11/2008 | Borgeson |
| 2008/0307454 A1 | 12/2008 | Ahanger et al. |
| 2008/0313140 A1 | 12/2008 | Pereira et al. |
| 2009/0022472 A1 | 1/2009 | Bronstein |
| 2009/0024641 A1 | 1/2009 | Quigley et al. |
| 2009/0034791 A1 | 2/2009 | Doretto |
| 2009/0037088 A1 | 2/2009 | Taguchi |
| 2009/0043637 A1 | 2/2009 | Eder |
| 2009/0043818 A1 | 2/2009 | Raichelgauz |
| 2009/0080759 A1 | 3/2009 | Bhaskar |
| 2009/0096634 A1 | 4/2009 | Emam et al. |
| 2009/0125544 A1 | 5/2009 | Brindley |
| 2009/0157575 A1 | 6/2009 | Schobben et al. |
| 2009/0165031 A1 | 6/2009 | Li et al. |
| 2009/0172030 A1 | 7/2009 | Schiff et al. |
| 2009/0208106 A1 | 8/2009 | Dunlop et al. |
| 2009/0208118 A1 | 8/2009 | Csurka |
| 2009/0216761 A1 | 8/2009 | Raichelgauz |
| 2009/0220138 A1 | 9/2009 | Zhang et al. |
| 2009/0245573 A1 | 10/2009 | Saptharishi et al. |
| 2009/0254572 A1 | 10/2009 | Redlich et al. |
| 2009/0278934 A1 | 11/2009 | Ecker |
| 2009/0282218 A1 | 11/2009 | Raichelgauz et al. |
| 2009/0297048 A1 | 12/2009 | Slotine et al. |
| 2010/0042646 A1 | 2/2010 | Raichelqauz |
| 2010/0082684 A1 | 4/2010 | Churchill |
| 2010/0104184 A1 | 4/2010 | Bronstein et al. |
| 2010/0111408 A1 | 5/2010 | Matsuhira |
| 2010/0125569 A1 | 5/2010 | Nair et al. |
| 2010/0162405 A1 | 6/2010 | Cook et al. |
| 2010/0191391 A1 | 7/2010 | Zeng |
| 2010/0198626 A1 | 8/2010 | Cho et al. |
| 2010/0212015 A1 | 8/2010 | Jin et al. |
| 2010/0284604 A1 | 11/2010 | Chrysanthakopoulos |
| 2010/0293057 A1 | 11/2010 | Haveliwala et al. |
| 2010/0306193 A1 | 12/2010 | Pereira |
| 2010/0312736 A1 | 12/2010 | Kello |
| 2010/0318493 A1 | 12/2010 | Wessling |
| 2010/0325138 A1 | 12/2010 | Lee et al. |

(56) References Cited

U.S. PATENT DOCUMENTS

| | | |
|---|---|---|
| 2010/0325581 A1 | 12/2010 | Finkelstein et al. |
| 2011/0029620 A1 | 2/2011 | Bonforte |
| 2011/0035373 A1 | 2/2011 | Berg et al. |
| 2011/0038545 A1 | 2/2011 | Bober |
| 2011/0055585 A1 | 3/2011 | Lee |
| 2011/0164180 A1 | 7/2011 | Lee |
| 2011/0164810 A1 | 7/2011 | Zang et al. |
| 2011/0216209 A1 | 9/2011 | Fredlund et al. |
| 2011/0218946 A1 | 9/2011 | Stern et al. |
| 2011/0246566 A1 | 10/2011 | Kashef |
| 2011/0276680 A1 | 11/2011 | Rimon |
| 2011/0296315 A1 | 12/2011 | Lin et al. |
| 2012/0131454 A1 | 5/2012 | Shah |
| 2012/0133497 A1 | 5/2012 | Sasaki |
| 2012/0136853 A1 | 5/2012 | Kennedy et al. |
| 2012/0167133 A1 | 6/2012 | Carroll et al. |
| 2012/0179642 A1 | 7/2012 | Sweeney et al. |
| 2012/0179751 A1 | 7/2012 | Ahn |
| 2012/0185445 A1 | 7/2012 | Borden et al. |
| 2012/0207346 A1 | 8/2012 | Kohli et al. |
| 2012/0221470 A1 | 8/2012 | Lyon |
| 2012/0227074 A1 | 9/2012 | Hill et al. |
| 2012/0239690 A1 | 9/2012 | Asikainen et al. |
| 2012/0239694 A1 | 9/2012 | Avner et al. |
| 2012/0265735 A1 | 10/2012 | McMillan et al. |
| 2012/0294514 A1 | 11/2012 | Saunders et al. |
| 2012/0299961 A1 | 11/2012 | Ramkumar et al. |
| 2012/0301105 A1 | 11/2012 | Rehg et al. |
| 2012/0331011 A1 | 12/2012 | Raichelgauz et al. |
| 2013/0043990 A1 | 2/2013 | Al-Jafar |
| 2013/0066856 A1 | 3/2013 | Ong et al. |
| 2013/0067364 A1 | 3/2013 | Berntson et al. |
| 2013/0086499 A1 | 4/2013 | Dyor et al. |
| 2013/0089248 A1 | 4/2013 | Remiszewski et al. |
| 2013/0103814 A1 | 4/2013 | Carrasco |
| 2013/0151522 A1 | 6/2013 | Aggarwal et al. |
| 2013/0159298 A1 | 6/2013 | Mason et al. |
| 2013/0212493 A1 | 8/2013 | Krishnamurthy |
| 2013/0226820 A1 | 8/2013 | Sedota, Jr. |
| 2013/0226930 A1 | 8/2013 | Amgren et al. |
| 2013/0227023 A1 | 8/2013 | Raichelgauz et al. |
| 2013/0283401 A1 | 10/2013 | Pabla et al. |
| 2013/0346412 A1 | 12/2013 | Raichelgauz et al. |
| 2014/0019264 A1 | 1/2014 | Wachman et al. |
| 2014/0025692 A1 | 1/2014 | Pappas |
| 2014/0059443 A1 | 2/2014 | Tabe |
| 2014/0095425 A1 | 4/2014 | Sipple |
| 2014/0111647 A1 | 4/2014 | Atsmon |
| 2014/0125703 A1 | 5/2014 | Roveta et al. |
| 2014/0147829 A1 | 5/2014 | Jerauld |
| 2014/0149918 A1 | 5/2014 | Asokan et al. |
| 2014/0152698 A1 | 6/2014 | Kim et al. |
| 2014/0156691 A1 | 6/2014 | Conwell |
| 2014/0169681 A1 | 6/2014 | Drake |
| 2014/0176604 A1 | 6/2014 | Venkitaraman et al. |
| 2014/0193077 A1 | 7/2014 | Shiiyama et al. |
| 2014/0198986 A1 | 7/2014 | Marchesotti |
| 2014/0201330 A1 | 7/2014 | Lozano Lopez |
| 2014/0250032 A1 | 9/2014 | Huang et al. |
| 2014/0282655 A1 | 9/2014 | Roberts |
| 2014/0300722 A1 | 10/2014 | Garcia |
| 2014/0330830 A1 | 11/2014 | Raichelgauz et al. |
| 2014/0341476 A1 | 11/2014 | Kulick et al. |
| 2014/0363044 A1 | 12/2014 | Williams et al. |
| 2014/0379477 A1 | 12/2014 | Sheinfeld |
| 2015/0033150 A1 | 1/2015 | Lee |
| 2015/0052089 A1 | 2/2015 | Kozloski et al. |
| 2015/0100562 A1 | 4/2015 | Kohlmeier et al. |
| 2015/0117784 A1 | 4/2015 | Lin |
| 2015/0120627 A1 | 4/2015 | Hunzinger et al. |
| 2015/0127516 A1 | 5/2015 | Studnitzer et al. |
| 2015/0134688 A1 | 5/2015 | Jing |
| 2015/0248586 A1 | 9/2015 | Gaidon et al. |
| 2015/0254344 A1 | 9/2015 | Kulkarni et al. |
| 2015/0286742 A1 | 10/2015 | Zhang et al. |
| 2015/0286872 A1 | 10/2015 | Medioni et al. |
| 2015/0324356 A1 | 11/2015 | Gutierrez et al. |
| 2015/0332588 A1 | 11/2015 | Bulan et al. |
| 2015/0363644 A1 | 12/2015 | Wnuk |
| 2016/0007083 A1 | 1/2016 | Gurha |
| 2016/0026707 A1 | 1/2016 | Ong et al. |
| 2016/0132194 A1 | 5/2016 | Grue et al. |
| 2016/0210525 A1 | 7/2016 | Yang |
| 2016/0221592 A1 | 8/2016 | Puttagunta |
| 2016/0275766 A1 | 9/2016 | Venetianer et al. |
| 2016/0306798 A1 | 10/2016 | Guo et al. |
| 2016/0342683 A1 | 11/2016 | Kwon |
| 2016/0357188 A1 | 12/2016 | Ansari |
| 2017/0017638 A1 | 1/2017 | Satyavarta et al. |
| 2017/0032257 A1 | 2/2017 | Sharifi |
| 2017/0041254 A1 | 2/2017 | Agara Venkatesha Rao |
| 2017/0109602 A1 | 4/2017 | Kim |
| 2017/0154241 A1 | 6/2017 | Shambik et al. |
| 2017/0255620 A1 | 9/2017 | Raichelgauz |
| 2017/0262437 A1 | 9/2017 | Raichelgauz |
| 2017/0323568 A1 | 11/2017 | Inoue |
| 2018/0081368 A1 | 3/2018 | Watanabe |
| 2018/0101177 A1 | 4/2018 | Cohen |
| 2018/0108258 A1 | 4/2018 | Dilger |
| 2018/0157903 A1 | 6/2018 | Tu et al. |
| 2018/0157916 A1 | 6/2018 | Doumbouya |
| 2018/0158323 A1 | 6/2018 | Takenaka |
| 2018/0189613 A1 | 7/2018 | Wolf et al. |
| 2018/0204111 A1 | 7/2018 | Zadeh |
| 2018/0373929 A1 | 12/2018 | Ye |
| 2019/0005726 A1 | 1/2019 | Nakano |
| 2019/0039627 A1 | 2/2019 | Yamamoto |
| 2019/0043274 A1 | 2/2019 | Hayakawa |
| 2019/0045244 A1 | 2/2019 | Balakrishnan |
| 2019/0056718 A1 | 2/2019 | Satou |
| 2019/0065951 A1 | 2/2019 | Luo |
| 2019/0096135 A1 | 3/2019 | Mutto et al. |
| 2019/0171912 A1 | 6/2019 | Vallespi-Gonzalez et al. |
| 2019/0188501 A1 | 6/2019 | Ryu |
| 2019/0220011 A1 | 7/2019 | Della Penna |
| 2019/0279046 A1 | 9/2019 | Han et al. |
| 2019/0304102 A1 | 10/2019 | Chen et al. |
| 2019/0317513 A1 | 10/2019 | Zhang |
| 2019/0364492 A1 | 11/2019 | Azizi |
| 2019/0384303 A1 | 12/2019 | Muller |
| 2019/0384312 A1 | 12/2019 | Herbach |
| 2019/0385460 A1 | 12/2019 | Magzimof |
| 2019/0389459 A1 | 12/2019 | Berntorp |
| 2020/0004248 A1 | 1/2020 | Healey |
| 2020/0004251 A1 | 1/2020 | Zhu |
| 2020/0004265 A1 | 1/2020 | Zhu |
| 2020/0005631 A1 | 1/2020 | Visintainer |
| 2020/0018606 A1 | 1/2020 | Wolcott |
| 2020/0018618 A1 | 1/2020 | Ozog |
| 2020/0020212 A1 | 1/2020 | Song |
| 2020/0050973 A1* | 2/2020 | Stenneth ............... G01C 21/32 |
| 2020/0073977 A1* | 3/2020 | Montemerlo ........... G06F 16/29 |
| 2020/0090484 A1 | 3/2020 | Chen |
| 2020/0097756 A1 | 3/2020 | Hashimoto |
| 2020/0133307 A1 | 4/2020 | Kelkar |
| 2020/0043326 A1 | 6/2020 | Tao |

FOREIGN PATENT DOCUMENTS

| | | |
|---|---|---|
| WO | 0231764 A2 | 4/2002 |
| WO | 2003067467 A1 | 8/2003 |
| WO | 2005027457 A1 | 3/2005 |
| WO | 2007049282 A2 | 5/2007 |
| WO | 2014076002 A1 | 5/2014 |
| WO | 2014137337 A1 | 9/2014 |
| WO | 2016040376 A1 | 3/2016 |
| WO | 2016070193 A1 | 5/2016 |

OTHER PUBLICATIONS

Lin et al., "Summarization of Large Scale Social Network Activity", DOI: 10.1109/ICASSP.2009.4960375, Apr. 2009, pp. 3481-3484.

(56) References Cited

OTHER PUBLICATIONS

Santos et al., "SCORM-MPEG: an ontology of interoperable metadata for Multimedia and e-Learning", DOI: 10.1109/SOFTCOM.2015.7314122, Nov. 2, 2015, pp. 5.

Scheper et al., "Nonlinear dynamics in neural computation", ESANN, 14th European Symposium on Artificial Neural Networks, Jan. 2006, pp. 491-502.

Schneider et al., "A Robust Content Based Digital Signature for Image Authentication", 3rd IEEE International Conference on Image Processing, Sep. 19, 2006, pp. 227-230.

Semizarov et al.,"Specificity of short interfering RNA determined through gene expression signatures", PNAS vol. 100 (11), May 27, 2003, pp. 6347-6352.

Sheng Hua et al., "Robust video signature based on ordinal measure", ICIP '04. 2004 International Conference on Image Processing, Oct. 2004, pp. 685-688.

Stolberg et al., "HiBRID-SoC: A multi-core SoC architecture for multimedia signal processing. VLSI Signal Processing", Journal of VLSI Signal Processing vol. 41(1), Aug. 2005, pp. 9-20.

Theodoropoulos et al., "Simulating asynchronous architectures on transputer networks", 4th Euromicro Workshop on Parallel and Distributed Processing, Braga, Portugal, 1996, pp. 274-281.

Vailaya et al., "Content-Based Hierarchical Classification of Vacation Images", International Conference on Multimedia Computing and Systems, vol. 1, DOI-10.1109/MMCS.1999.779255, Jul. 1999, pp. 518-523.

Verstraeten et al., "Isolated word recognition with the Liquid State Machine: A case study", Information Processing Letters, vol. 95(6), Sep. 2005, pp. 521-528.

Vallet et al., "Personalized Content Retrieval in Context Using Ontological Knowledge", in IEEE Transactions on Circuits and Systems for Video Technology, vol. 17, No. 3, Mar. 2007, pp. 336-346.

Wang et al., "Classifying objectionable websites based on image content" Interactive Distributed Multimedia Systems and Telecommunication Services, vol. 1483, 1998, pp. 113-124.

Wang et al., "A Signature for Content-Based Image Retrieval Using a Geometrical Transform", 6th ACM International Conference on Multimedia, Multimedia 1998, pp. 229-234.

Ware et al., "Locating and identifying components in a robot's workspace using a hybrid computer architecture", 10th International Symposium on Intelligent Control, 1995, pp. 139-144.

Li et al. "Exploring Visual and Motion Saliency for Automatic Video Object Extraction", in IEEE Transactions on Image Processing, vol. 22, No. 7, Jul. 2013, pp. 2600-2610.

Colin Whitby-Strevens, "The transputer", 12th annual international symposium on Computer architecture (ISCA), IEEE Computer Society Press, Jun. 1985, pp. 292-300.

Wilk et al., "The potential of social-aware multimedia prefetching on mobile devices", International Conference and Workshops on Networked Systems (NetSys 2015) Mar. 2015, p. 1.

Andrew William Hogue, "Tree pattern inference and matching for wrapper induction on the World Wide Web", May 13, 2014, pp. 106.

Liu et al. "Instant Mobile Video Search With Layered Audio-Video Indexing and Progressive Transmission", IEEE Transactions on Multimedia 16(8, Dec. 2014, pp. 2242-2255.

Raichelgauz et al., "Natural Signal Classification by Neural Cliques and Phase-Locked Attractors", International Conference of the IEEE Engineering in Medicine and Biology Society, 2006, pp. 6693-6697.

Lin et al., "Robust digital signature for multimedia authentication", IEEE Circuits and Systems Magazine, vol. 3, No. 4, 2003, pp. 23-26.

Zang et al., "A New Multimedia Message Customizing Framework for mobile Devices", IEEE International Conference on Multimedia and Expo, 2007, pp. 1043-1046.

Zhou et al., "Ensembling neural networks: Many could be better than all", Artificial Intelligence, vol. 137, 2002, pp. 239-263.

Zhou et al., "Medical diagnosis with C4.5 rule preceded by artificial neural network ensemble", IEEE Transactions on Information Technology in Biomedicine, vol. 7, No. 1, Mar. 2003, pp. 37-42.

Zhu et al., "Technology-Assisted Dietary Assessment", SPIE. 6814. 681411, 2008, p. 1.

Zou et al., "A content-based image authentication system with lossless data hiding", International Conference on Multimedia and Expo. ICME, 2003, pp. II(213)-II(216).

Akira et al., "Columbia University's Baseline Detectors for 374 LSCOM Semantic Visual Concepts", Columbia University ADVENT Technical Report #222-2006-8, Mar. 20, 2007, pp. 17.

Amparo et al., "Real Time Speaker Localization and Detection System for Camera Steering In Multiparticipant Videoconferencing Environments", IEEE International Conference on Acoustics, Speech and Signal Processing 2011, pp. 2592-2595.

Boari et al., "Adaptive Routing for Dynamic Applications In Massively Parallel Architectures", IEEE Parallel & Distributed Technology: Systems & Applications (vol. 3, Issue: 1, Spring 1995), pp. 61-74.

Boyer et al., "A Crossover Operator for Evolutionary Algorithms Based on Population Features", Journal of Artificial Intelligence Research vol. 24 (2005) pp. 1-48.

Brecheisen et al., ""Hierarchical Genre Classification for Large Music Collections"", IEEE International Conference on Multimedia and Expo (ICME) 2006, pp. 1385-1388.

Burgsteiner et al., "Movement prediction from real-world images using a liquid state machine",International Conference on Industrial, Engineering and Other Applications of Applied Intelligent Systems IEA/AIE 2005: Innovations in Applied Artificial Intelligence, pp. 121-130.

Cernansky et al., "Feed-forward echo state networks", IEEE International Joint Conference on Neural Networks, 2005, vol. 3, pp. 1479-1482.

Chang et al., "VideoQ: a fully automated video retrieval system using motion sketches", Fourth IEEE Workshop on Applications of Computer Vision. WACV'98 (Cat. No. 98EX201), Oct. 19-21, 1998, pp. 270-271.

Cho et al.,"Efficient Motion-Vector-Based Video Search Using Query by Clip", IEEE International Conference on Multimedia and Expo (ICME) (IEEE Cat. No. 04TH8763), Year: 2004, vol. 2, pp. 1027-1030.

Clement et al."Speaker diarization of heterogeneous web video files: A preliminary study", IEEE International Conference on Acoustics, Speech and Signal Processing (ICASSP), May 22-27, 2011 pp. 4432-4435.

Cococcioni et al., "Automatic diagnosis of defects of rolling element bearings based on computational intelligence techniques", Ninth International Conference on Intelligent Systems Design and Applications, Nov. 30-Dec. 2, 2009, pp. 970-975.

Emami et al., "Role of Spatiotemporal Oriented Energy Features for Robust Visual Tracking in Video Surveillance", IEEE Ninth International Conference on Advanced Video and Signal-Based Surveillance Sep. 18-21, 2012, pp. 349-354.

Fathy et al., "A parallel design and implementation for backpropagation neural network using MIMD architecture", 8th Mediterranean Electrotechnical Conference on Industrial Applications in Power Systems, Computer Science and Telecommunications (MELECON 96) , May 16, 1996,1472-1476.

Foote et al.,"Content-based retrieval of music and audio", Multimedia Storage and Archiving Systems II, Published in SPIE Proceedings vol. 3229, Oct. 6, 1997, p. 1.

Freisleben et al., "Recognition of fractal images using a neural network",New Trends in Neural Computation, International Workshop on Artificial Neural Networks, IWANN '93 Sitges, Spain, Jun. 9-11, 1993: , pp. 632-637.

Ivan Garcia, "Solving the Weighted Region Least Cost Path Problem Using Transputers", Naval Postgraduate School Monterey, California ,1989 pp. 73.

Gomes et al., "Audio Watermarking and Fingerprinting: for Which Applications?", Journal of New Music Research 32(1) Mar. 2003 p. 1.

Gong et al., "A Knowledge-Based Mediator for Dynamic Integration of Heterogeneous Multimedia Information Sources", Interna-

(56) References Cited

OTHER PUBLICATIONS tional Symposium on Intelligent Multimedia, Video and Speech Processing, Oct. 20-22, 2004, pp. 467-470.
Guo et al., "AdOn: An Intelligent Overlay Video Advertising System", https://doi.org/10.1145/1571941.1572049, Jul. 2009, pp. 628-629.
Howlett et al., "A Multi-Computer Neural Network Architecture in a Virtual Sensor System Application", International Journal of Knowledge-Based and Intelligent Engineering Systems, vol. 4, Published—Apr. 2000 pp. 86-93.
Hua et al., "Robust Video Signature Based on Ordinal Measure", International Conference on Image Processing ICIP '04. 2004, Oct. 24-27, 2004, pp. 5.
Iwamoto et al, "Image Signature Robust to Caption Superimposition for Video Sequence Identification", 2006 International Conference on Image Processing ,IEEE, Atlanta, GA, Oct. 8-11, 2006, pp. 3185-3188.
Herbert Jaeger, "The" echo state"approach to analysing and training recurrent neural networks", Bonn, Germany: German National Research Center for Information Technology GMD Technical Report, 148 ,2001, pp. 43.
Jianping Fan et al., "Concept-Oriented Indexing of Video Databases: Toward Semantic Sensitive Retrieval and Browsing", IEEE Transactions on Image Processing, vol. 13, No. 7, Jul. 2004, p. 1.
John L. Johnson., Pulse-coupled neural nets: translation, rotation, scale, distortion, and intensity signal invariance for images, vol. 33, No. 26, Applied Optics, Sep. 10, 1994, pp. 6239-6253.
Odinaev et al., "Cliques in Neural Ensembles as Perception Carriers", 2006 International Joint Conference on Neural Networks Sheraton Vancouver Wail Centre Hotel, Vancouver, BC, Canada Jul. 16-21, 2006, pp. 285-292.
Kabary et al., "SportSense: Using Motion Queries to Find Scenes in Sports Videos", DOI: 10.1145/2505515.2508211, Oct. 2013, pp. 2489-2491.
Keiji Yanai., "Generic Image Classification Using Visual Knowledge on the Web", DOI: 10.1145/957013.957047, Jan. 2003, pp. 167-176.
Lau et al., "Semantic Web Service Adaptation Model for a Pervasive Learning Scenario", Proceedings of the 2008 IEEE Conference on innovative Technologies in Intelligent Systems and Industrial Applications Multimedia University, Cyberjaya, Malaysia. Jul. 12-13, 2008, pp. 98-103.
Li et al., "Matching Commercial Clips from TV Streams Using a Unique, Robust and Compact Signature", DOI: 10.1109/DICTA. 2005.52, Jan. 2006, pp. 7.
Lin et al., "Generating Robust Digital Signature for Image/Video Authentication", Multimedia and Security Workshop at ACM Multimedia '98. Bristol. U.K., Sep. 1998, pp. 49-54.
Löytynoja et al., "Audio Encryption Using Fragile Watermarking", DOI: 10.1109/ICICS.2005.1689175, Jul. 2015, pp. 881-885.
Richard F. Lyon., "Computational Models of Neural Auditory Processing", DOI: 10.1109/ICASSP.1984.1172756, ICASSP '84. IEEE International Conference on Acoustics, Speech, and Signal Processing, Jan. 29, 2003, pp. 5.
Maass et al., "Computational Models for Generic Cortical Microcircuits", DOI: 10.1201/9780203494462.ch18, Jun. 10, 2003, pp. 1-26.
Mandhaoui et al., "Emotional speech characterization based on multi-features fusion for face-to-face interaction", 2009 International conference on signals, circuits and systems ,DOI: 10.1109/ICSCS.2009.5412691, Dec. 2009, pp. 1-6.
May et al., "The Transputer", Neural Computers. Springer Study Edition, vol. 41. Springer, Berlin, Heidelberg, DOI: 10.1007/978-3-642-83740-1_48, Jan. 1989 pp. 477-486.
McNamara et al., "Diversity Decay in Opportunistic Content Sharing Systems", DOI: 10.1109/WoWMoM.2011.5986211 2011 IEEE International Symposium on a World of Wireless, Mobile and Multimedia Networks Aug. 15, 2011, pp. 1-3.

Mei et al., "Contextual in-image Advertising",MM'OS, Oct. 26-31, 2008. Vancouver, British Columbia, Canada. Copyright 2008 ACM 978-1-60558-303-7/08/10, DOI: 10.1145/1459359.1459418•Source: DBLP, Jan. 2008, pp. 439-448.
Mei et al., "VideoSense—Towards Effective Online Video Advertising", MM'07, Sep. 23-28, 2007, Augsburg, Bavaria, Germany. Copyright 2007 ACM 978-1-59593-701-8/07/0009 . . . $5.00, Jan. 2007, pp. 1075-1084.
Mladenovic et al., "Electronic Tour Guide for Android Mobile Platform with Multimedia Travel Book" 20th Telecommunications forum TELFOR 2012, DOI: 10.1109/TELFOR.2012.6419494, Nov. 20-22, 2012, pp. 1460-1463.
Morad et al., "Performance, Power Efficiency and Scalability of Asymmetric Cluster Chip Multiprocessors", IEEE Computer Architecture Letters, vol. 5, 2006, DOI 10.1109/L-CA.2006.6, Jul. 5, 2006, pp. 4.
Nagy et al., "A Transputer Based, Flexible, Real-Time Control System for Robotic Manipulators", UKACC International Conference on Control '96, Conference Publication No. 427 © IEE 1996, Sep. 2-5 1996, pp. 84-89.
Nam et al., "Audio-Visual Content-Based Violent Scene Characterization", Proceedings 1998 International Conference on Image Processing. ICIP98 (Cat. No. 98CB36269), DOI: 10.1109/ICIP. 1998.723496, pp. 353-357.
Natschläger et al., "The "Liquid Computer": A Novel Strategy for Real-Time Computing on Time Series", Jan. 2002, pp. 1-7.
Nouza et al., "Large-Scale Processing, Indexing and Search System for Czech Audio-Visual Cultural Heritage Archives", DOI: 10.1109/MMSP.2012.6343465, Sep. 2012, pp. 337-342.
Odinaev., "Cliques tu Neural Ensembles as Perception Carriers", 2006 International Joint Conference on Neural Networks Sheraton Vancouver Wail Centre Hotel, Vancouver, BC, Canada, DOI: 10.1109/IJCNN.2006.246693, Jul. 16-21, 2006, pp. 285-292.
Park et al., "Compact Video Signatures for Near-Duplicate Detection on Mobile Devices", DOI: 10.1109/ISCE.2014.6884293, Jun. 2014, pp. 1-2.
Maria Paula Queluz., "Content-based integrity protection of digital images", San Jose. California •Jan. 1999 SPIE vol. 3657 •0277-786X/99/$10.00, DOI: 10.1117/12.344706, Apr. 1999, pp. 85-93.
Raichelgauz et al., "Co-evoletiooary Learning in Liquid Architectures", DOI: 10.1007/11494669_30, Jun. 2005, pp. 241-248.
Ribert et al., "An Incremental Hierarchical Clustering", Vision Interface '99, Trois-Rivieres, Canada, May 19-21, pp. 586-591.
"Computer Vision Demonstration Website", Electronics and Computer Science, University of Southampton, 2005, USA.
Big Bang Theory Series 04 Episode 12, aired Jan. 6, 2011; [retrieved from Internet: ].
Boari et al, "Adaptive Routing for Dynamic Applications in Massively Parallel Architectures", 1995 IEEE, Spring 1995, pp. 1-14.
Burgsteiner et al., "Movement Prediction from Real-World Images Using a Liquid State machine", Innovations in Applied Artificial Intelligence Lecture Notes in Computer Science, Lecture Notes in Artificial Intelligence, LNCS, Springer-Verlag, BE, vol. 3533, Jun. 2005, pp. 121-130.
Cernansky et al, "Feed-forward Echo State Networks", Proceedings of International Joint Conference on Neural Networks, Montreal, Canada, Jul. 31-Aug. 4, 2005, pp. 1-4.
Chinchor, Nancy A. et al.; Multimedia Analysis + Visual Analytics = Multimedia Analytics; IEEE Computer Society; 2010; pp. 52-60. (Year: 2010).
Fathy et al, "A Parallel Design and Implementation for Backpropagation Neural Network Using MIMD Architecture", 8th Mediterranean Electrotechnical Conference, 19'96. MELECON '96, Date of Conference: May 13-16, 1996, vol. 3 pp. 1472-1475, vol. 3.
Freisleben et al, "Recognition of Fractal Images Using a Neural Network", Lecture Notes in Computer Science, 1993, vol. 6861, 1993, pp. 631-637.
Garcia, "Solving the Weighted Region Least Cost Path Problem Using Transputers", Naval Postgraduate School, Monterey, California, Dec. 1989.
Guo et al, AdOn: An Intelligent Overlay Video Advertising System (Year: 2009).

(56) References Cited

OTHER PUBLICATIONS

Hogue, "Tree Pattern Inference and Matching for Wrapper Induction on the World Wide Web", Master's Thesis, Massachusetts Institute of Technology, Jun. 2004, pp. 1-106.
Howlett et al, "A Multi-Computer Neural Network Architecture in a Virtual Sensor System Application", International journal of knowledge-based intelligent engineering systems, 4 (2). pp. 86-93, 133N 1327-2314.
Hua et al., "Robust Video Signature Based on Ordinal Measure", Image Processing, 2004, 2004 International Conference on Image Processing (ICIP), vol. 1, IEEE, pp. 685-688, 2004.
International Search Report and Written Opinion for PCT/US2016/050471, ISA/RU, Moscow, RU, dated May 4, 2017.
International Search Report and Written Opinion for PCT/US2016/054634, ISA/RU, Moscow, RU, dated Mar. 16, 2017.
International Search Report and Written Opinion for PCT/US2017/015831, ISA/RU, Moscow, RU, dated Apr. 20, 2017.
Johnson et al, "Pulse-Coupled Neural Nets: Translation, Rotation, Scale, Distortion, and Intensity Signal Invariance for Images", Applied Optics, vol. 33, No. 26, 1994, pp. 6239-6253.
Lau et al., "Semantic Web Service Adaptation Model for a Pervasive Learning Scenario", 2008 IEEE Conference on Innovative Technologies in Intelligent Systems and Industrial Applications, 2008, pp. 98-103.
Li et al ("Matching Commercial Clips from TV Streams Using a Unique, Robust and Compact Signature" 2005) (Year: 2005).
Lin et al., "Generating robust digital signature for image/video authentication", Multimedia and Security Workshop at ACM Multimedia '98, Bristol, U.K., Sep. 1998, pp. 245-251.
Lu et al, "Structural Digital Signature for Image Authentication: An Incidental Distortion Resistant Scheme", IEEE Transactions on Multimedia, vol. 5, No. 2, Jun. 2003, pp. 161-173.
Lyon, "Computational Models of Neural Auditory Processing", IEEE International Conference on Acoustics, Speech, and Signal Processing, ICASSP '84, Date of Conference: Mar 1984, vol. 9, pp. 41-44.
Ma Et El "Semantics modeling based image retrieval system using neural networks", 2005.
Marian Stewart B et al., "Independent component representations for face recognition", Proceedings of the SPIE Symposium on Electronic Imaging: Science and Technology; Conference on Human Vision and Electronic Imaging III, San Jose, California, Jan. 1998, pp. 1-12.
May et al, "The Transputer", Springer-Verlag Berlin Heidelberg 1989, vol. 41.
McNamara et al., "Diversity Decay in opportunistic Content Sharing Systems", 2011 IEEE International Symposium on a World of Wireless, Mobile and Multimedia Networks, pp. 1-3.
Morad et al., "Performance, Power Efficiency and Scalability of Asymmetric Cluster Chip Multiprocessors", Computer Architecture Letters, vol. 4, Jul. 4, 2005, pp. 1-4, XP002466254.
Nagy et al, "A Transputer, Based, Flexible, Real-Time Control System for Robotic Manipulators", UKACC International Conference on Control '96, Sep. 2-5, 1996, Conference Publication No. 427, IEE 1996.
Natschlager et al., "The "Liquid Computer": A novel strategy for real-time computing on time series", Special Issue on Foundations of Information Processing of telematik, vol. 8, No. 1, 2002, pp. 39-43, XP002466253.
Odinaev et al, "Cliques in Neural Ensembles as Perception Carriers", Technion—Institute of Technology, 2006 International Joint Conference on neural Networks, Canada, 2006, pp. 285-292.
Ortiz-Boyer et al, "CIXL2: A Crossover Operator for Evolutionary Algorithms Based on Population Features", Journal of Artificial Intelligence Research 24 (2005) Submitted 11 /04; published Jul. 2005, pp. 1-48.
Pandya etal. A Survey on QR Codes: in context of Research and Application. International Journal of Emerging Technology and U Advanced Engineering. ISSN 2250-2459, ISO 9001:2008 Certified Journal, vol. 4, Issue 3, Mar. 2014 (Year: 2014).

Queluz, "Content-Based Integrity Protection of Digital Images", SPIE Conf. on Security and Watermarking of Multimedia Contents, San Jose, Jan. 1999, pp. 85-93.
Rui, Yong et al. "Relevance feedback: a power tool for interactive content-based image retrieval." IEEE Transactions on circuits and systems for video technology 8.5 (1998): 644-655.
Santos et al., "SCORM-MPEG: an Ontology of Interoperable Metadata for multimediaand E-Learning", 23rd International Conference on Software, Telecommunications and Computer Networks (SoftCom), 2015, pp. 224-228.
Scheper et al, "Nonlinear dynamics in neural computation", ESANN'2006 proceedings—European Symposium on Artificial Neural Networks, Bruges (Belgium), Apr. 26-28, 2006, d-side publication, ISBN 2-930307-06-4, pp. 1-12.
Schneider et al, "A Robust Content based Digital Signature for Image Authentication", Proc. ICIP 1996, Lausane, Switzerland, Oct. 1996, pp. 227-230.
Srihari et al., "Intelligent Indexing and Semantic Retrieval of Multimodal Documents", Kluwer Academic Publishers, May 2000, vol. 2, Issue 2-3, pp. 245-275.
Srihari, Rohini K. "Automatic indexing and content-based retrieval of captioned images" Computer 0 (1995): 49-56.
Stolberg et al ("HIBRID-SOC: A Multi-Core SOC Architecture for Multimedia Signal Processing" 2003).
Stolberg et al, "HIBRID-SOC: A Mul Ti-Core SOC Architecture for Mul Timedia Signal Processing", 2003 IEEE, pp. 189-194.
Theodoropoulos et al, "Simulating Asynchronous Architectures on Transputer Networks", Proceedings of the Fourth Euromicro Workshop on Parallel and Distributed Processing, 1996. PDP '96, pp. 274-281.
Vallet et al ("Personalized Content Retrieval in Context Using Ontological Knowledge" Mar. 2007) (Year: 2007).
Verstraeten et al, "Isolated word recognition with the Liquid State Machine: a case study", Department of Electronics and Information Systems, Ghent University, Sint-Pietersnieuwstraat 41, 9000 Gent, Belgium, Available onlline Jul. 14, 2005, pp. 521-528.
Wang et al., "Classifying Objectionable Websites Based onImage Content", Stanford University, pp. 1-12.
Ware et al, "Locating and Identifying Components in a Robot's Workspace using a Hybrid Computer Architecture" Proceedings of the 1995 IEEE International Symposium on Intelligent Control, Aug. 27-29, 1995, pp. 139-144.
Whitby-Strevens, "The transputer", 1985 IEEE, pp. 292-300.
Wilk et al., "The Potential of Social-Aware Multimedia Prefetching on Mobile Devices", International Conference and Workshops on networked Systems (NetSys), 2015, pp. 1-5.
Yanagawa et al, "Columbia University's Baseline Detectors for 374 LSCOM Semantic Visual Concepts", Columbia University ADVENT Technical Report # 222-2006-8, Mar. 20, 2007, pp. 1-17.
Yanagawa et al., "Columbia University's Baseline Detectors for 374 LSCOM Semantic Visual Concepts", Columbia University ADVENT Technical Report #222, 2007, pp. 2006-2008.
Zhou et al, "Ensembling neural networks: Many could be better than all", National Laboratory for Novel Software Technology, Nanjing University, Hankou Road 22, Nanjing 210093, PR China, Available online Mar. 12, 2002, pp. 239-263.
Zhou et al, "Medical Diagnosis With C4.5 Rule Preceded by Artificial Neural Network Ensemble", IEEE Transactions on Information Technology in Biomedicine, vol. 7, Issue: 1, Mar. 2003, pp. 37-42.
Zhu et al., "Technology-Assisted Dietary Assesment", Proc SPIE. Mar. 20, 2008, pp. 1-15.
Zou et al., "A Content-Based Image Authentication System with Lossless Data Hiding", ICME 2003, pp. 213-216.
Jasinschi et al., A Probabilistic Layered Framework for Integrating Multimedia Content and Context Information, 2002, IEEE, p. 2057-2060. (Year: 2002).
Jones et al., "Contextual Dynamics of Group-Based Sharing Decisions", 2011, University of Bath, p. 1777-1786. (Year: 2011).
Iwamoto, "Image Signature Robust to Caption Superimpostion for Video Sequence Identification", IEEE, pp. 3185-3188 (Year: 2006).
Cooperative Multi-Scale Convolutional Neural, Networks for Person Detection, Markus Eisenbach, Daniel Seichter, Tim Wengefeld,

(56) References Cited

OTHER PUBLICATIONS and Horst-Michael Gross Ilmenau University of Technology, Neuroinformatics and Cognitive Robotics Lab (Year; 2016).
Chen, Yixin, James Ze Wang, and Robert Krovetz. "CLUE: cluster-based retrieval of images by unsupervised learning." IEEE transactions on Image Processing 14.8 (2005); 1187-1201. (Year: 2005).
Wusk et al (Non-Invasive detection of Respiration and Heart Rate with a Vehicle Seat Sensor; www.mdpi.com/journal/sensors; Published: May 8, 2018). (Year: 2018).
Chen, Tiffany Yu-Han, et al. "Glimpse: Continuous, real-time object recognition on mobile devices." Proceedings of the 13th ACM Confrecene on Embedded Networked Sensor Systems. 2015. (Year: 2015).

\* cited by examiner

DETECTION OF ROAD ELEMENTS

CROSS REFERENCE

This application claims priority from US provisional patent serial number 62/771,323, filing date Nov. 26, 2018.

BACKGROUND

Autonomous vehicle are required to detect road elements such as junctions, crossing and roundabouts.

Road elements may be detected based on a set of predefined characters such as the existence of traffic lights, specific road signs, zebra crossings.

It has been found that detection that is based on predefined characters may only detect some of the road elements—as these predefined characters do not appear in each road element. For example—only some roundabouts are preceded by appropriate road signs.

There is a goring need to detect road elements in an efficient manner.

SUMMARY

There are provided systems, method and computer readable mediums for detecting road elements.

BRIEF DESCRIPTION OF THE DRAWINGS

In order to understand the invention and to see how it may be carried out in practice, a preferred embodiment will now be described, by way of non-limiting example only, with reference to the accompanying drawings.

DETAILED DESCRIPTION OF THE DRAWINGS

Any reference to a system should be applied, mutatis mutandis to a method that is executed by a system and/or to a non-transitory computer readable medium that stores instructions that once executed by the system will cause the system to execute the method.

Any reference to method should be applied, mutatis mutandis to a system that is configured to execute the method and/or to a non-transitory computer readable medium that stores instructions that once executed by the system will cause the system to execute the method.

Any reference to a non-transitory computer readable medium should be applied, mutatis mutandis to a method that is executed by a system and/or a system that is configured to execute the instructions stored in the non-transitory computer readable medium.

The term "and/or" is additionally or alternatively.

The following systems, method and computer readable mediums may use predefined identifiers as road element identifiers during an unsupervised process of learning actual identifiers of road elements. The unsupervised learning does not suffer from the limitations of the supervised learning (limited set of predefined identifier, dependency on predefined identifiers that may not exists in each instance of a road element), enhances the detection capabilities of road elements as it is not limited by the set of predefined identifiers, enables a reliable detection of road elements even when the predefined identifiers are not present (or not detected on the fly), may be based on a compact set of predefined identifiers, may be executed by remote computerized system and/or on vehicle mounted processors, may dynamically track changed in the road elements, may use a vast amount of road related information acquired from vehicle (that use relatively cheap sensors, may require a transmission of limited amount of road related information (for example—only acquired during relevant time windows), may be adjustable (selection of actual identifiers out of potential identifiers may be done using adjustable parameters).

Figure 1:
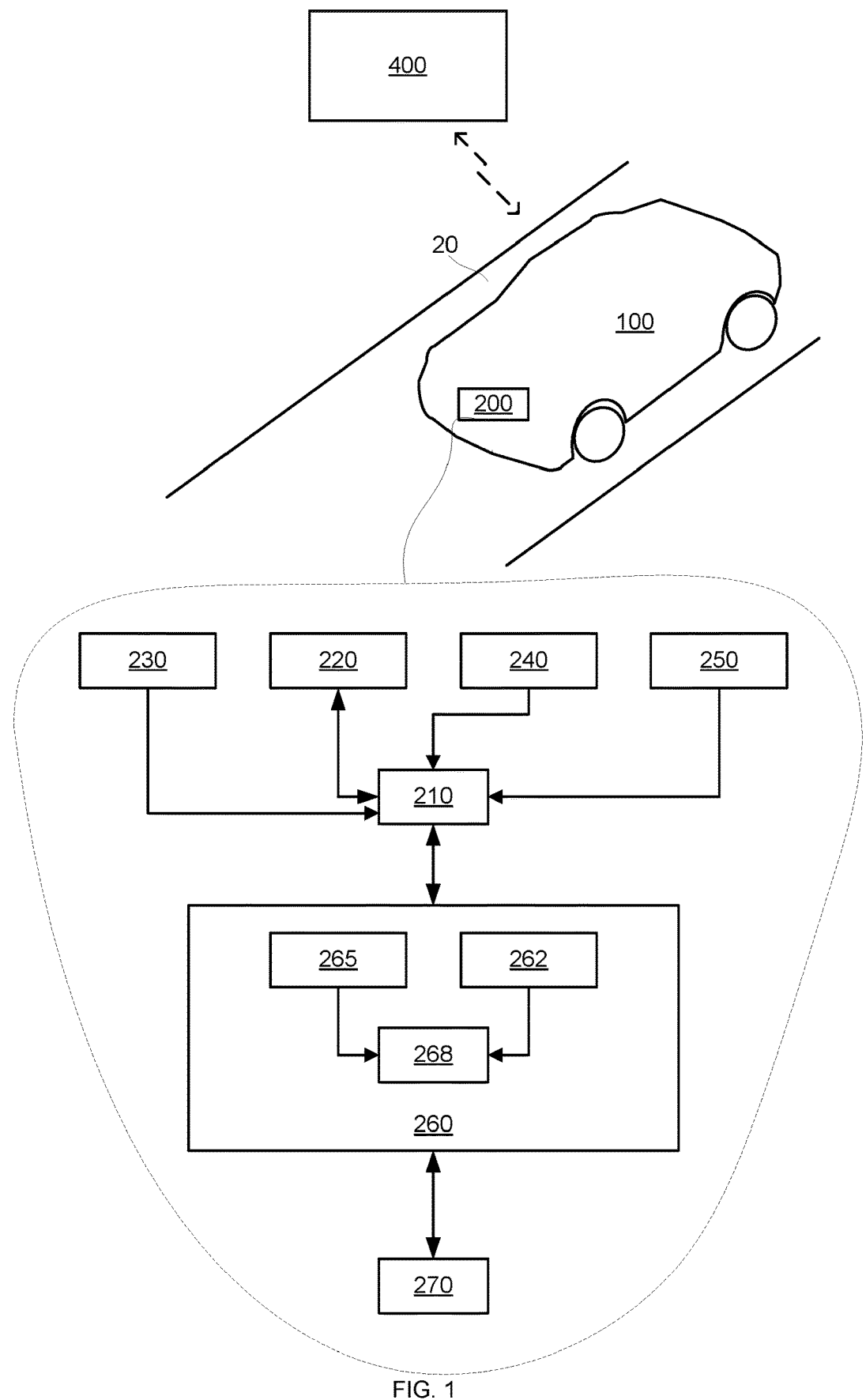
FIG. 1 illustrates an example of a vehicle and a remote computerized system.

Reference is now made to FIG. 1 which is a block diagram of a vehicle 100 that drives a long a road 20 and communicates with a remote computerized system 400.

Vehicle 100 includes an advanced driver-assistance system (ADAS) or autonomous driving system 200, constructed and implemented in accordance with embodiments described herein. For simplicity of explanation the following text will refer to system 200 or to autonomous driving system. Any reference to an autonomous driving system may be applied mutatis mutandis to a Advanced driver-assistance system.

Autonomous driving system 200 may include processing circuitry 210, input/output (I/O) module 220, camera 230, telemetry ECU 240, shock sensor 250, autonomous driving manager 260, and database 270.

Autonomous driving manager 260 may be instantiated in a suitable memory for storing software such as, for example, an optical storage medium, a magnetic storage medium, an electronic storage medium, and/or a combination thereof. It will be appreciated that autonomous driving system 200 may be implemented as an integrated component of an onboard computer system in a vehicle, such as, for example, vehicle 100 from FIG. 1.

Alternatively, system 200 may be implemented and a separate component in communication with the onboard computer system. It will also be appreciated that in the interests of clarity, while autonomous driving system 200 may comprise additional components and/or functionality e.g., for autonomous driving of vehicle 100, such additional components and/or functionality are not depicted in FIG. 1 and/or described herein.

Processing circuitry 210 may be operative to execute instructions stored in memory (not shown). For example, processing circuitry 210 may be operative to execute autonomous driving manager 260.

It will be appreciated that processing circuitry 210 may be implemented as a central processing unit (CPU), and/or one or more other integrated circuits such as application-specific integrated circuits (ASICs), field programmable gate arrays (FPGAs), full-custom integrated circuits, etc., or a combination of such integrated circuits. It will similarly be appreciated that autonomous driving system 200 may include more than one instance of processing circuitry 210. For example, one such instance of processing circuitry 210 may be a special purpose processor operative to execute autonomous driving manager 260 to perform some, or all, of the functionality of autonomous driving system 200 as described herein.

I/O module 220 may be any suitable communications component such as a network interface card, universal serial bus (USB) port, disk reader, modem or transceiver that may be operative to use protocols such as are known in the art to communicate either directly, or indirectly, with other elements such as, for example, remote computerized system 400, camera 230, telemetry ECU 240, and/or shock sensor 250.

As such, I/O module 220 may be operative to use a wired or wireless connection to connect to remote computerized system 400 via a communications network such as a local area network, a backbone network and/or the Internet, etc. I/O module 220 may also be operative to use a wired or wireless connection to connect to other components of system 200, e.g., camera 230, telemetry ECU 240, and/or shock sensor 250. It will be appreciated that in operation I/O module 220 may be implemented as a multiplicity of modules, where different modules may be operative to use different communication technologies. For example, a module providing mobile network connectivity may be used to connect to remote computerized system 400, whereas a local area wired connection may be used to connect to camera 230, telemetry ECU 240, and/or shock sensor 250.

In accordance with embodiments described herein, camera 230, telemetry ECU 240, and shock sensor 250 represent implementations of sensors. It will be appreciated that camera 230, telemetry ECU 240, and/or shock sensor 250 may be implemented as integrated components of vehicle 100 and may provide other functionality that is the interests of clarity is not explicitly described herein. As described hereinbelow, system 200 may use information about a current driving environment as received from camera 230, telemetry ECU 240, and/or shock sensor 250 to determine to detect road elements such as but not limited to roundabouts, junctions and/or crossings.

Autonomous driving manager 260 may be an application implemented in hardware, firmware, or software that may be executed by processing circuitry 210 to provide driving instructions to vehicle 100.

For example, autonomous driving manager 260 may use images received from camera 230 and/or telemetry data received from telemetry ECU 240 to determine an appropriate driving policy for arriving at a given destination and provide driving instructions to vehicle 100 accordingly. It will be appreciated that autonomous driving manager 260 may also be operative to use other data sources when determining a driving policy, e.g., maps of potential routes, traffic congestion reports, etc.

Figure 2:
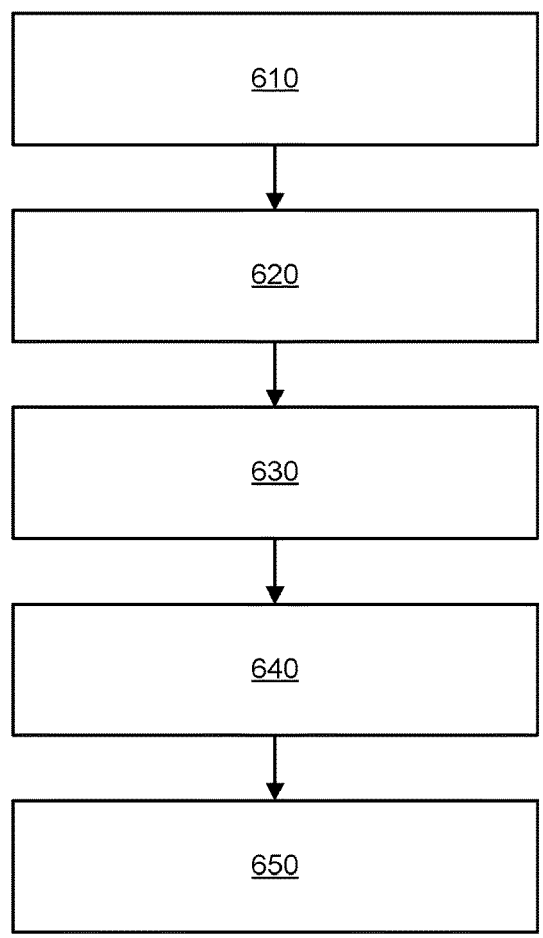
FIG. 2 illustrates an example of a method.

FIG. 2 illustrates an example of a method 600 for detecting road elements.

Method 600 may start by step 610 of receiving or detecting predefined identifiers of road elements.

Step 610 may include applying a supervised learning process (for example by a neural network or any other machine learning process applied by a machine learning device) on road related information.

For example—images of predefined identifiers of road elements (such as junction traffic signs, roundabout traffic signs, crossing traffic signs, traffic lights, and the like) as well as indications of the content of these images (at least identifying the predefined identifiers) are fed to a neural network/machine learning device thereby training the neural network/machine learning device to identify the predefined identifiers.

Step 610 may include receiving the outcome of supervised learning process.

Step 610 may be followed by step 620 of receiving road related information sensed by vehicles. The road related information may include visual information (for example images acquired by one or more visual sensors of a vehicle), and/or audio information and/or non-visual and non-audio information sensed by the vehicle for example any telemetry information, force, speed, acceleration sensed by the vehicle, and the like.

Additionally or alternatively, at least some of the road related information may be detected by sensors located outside the vehicles—for example traffic monitoring cameras or other sensors.

Step 620 may be followed by step 630 of detecting predefined identifiers of road elements, in road related information sensed by vehicles.

Step 430 may be followed by step 640 of detecting potential identifiers of road elements that differ from the predefined identifiers of road elements.

Step 640 may include processing road related information that was acquired by the vehicles during relevant time windows related to timings of detection of the predefined identifiers by the multiple vehicles. For example assuming that a vehicle sensed a predefined identifier at point of time T1 then the vehicle may transmit and/or process road related information within a relevant time window that is related to T1 in the sense that there is a known timing relationship between T1 and the relevant time window. The relevant time window may or may not include T1. The term "sensed" may refer to any one of the acquisition of the predefined identifier by a sensor, to the determination (detection) that the predefined identifier was sensed, and the like. For example—an image sensor may acquire an image of a predefined identifier and the system may identify the predefined identifier in the image at another point of time.

It should be noted that different vehicle may define the same relevant time window in relation to the sensing of the same predefined identifier—but at least two vehicles may define different relevant time windows in relation to the sensing of the same predefined identifier. Differences may stem from differences in the sensing process, from different processing and/or transmission and/or memory resources, and the like.

The relevant time window may start before T1, may start at T1, may start after T1, may end at T1, may end after T1, and the like.

The length and/or any timing parameter of any relevant time window may fulfill at least one of the following

- be fixed (for example 0.5, 1, 2, 10, 20, 30, 40, 60, 90, 120, 180 seconds or more).
- change over time.
- depend on the potential identifier.
- depend on whether the predefined identifier is expected to preceded the road element.
- depend on whether the predefined identifier is expected to follow the road element.
- depend on resources (at least one communication, storage, processing) of the vehicle.
- depend on resources (at least one communication, storage, processing) of the remote computerized system.
- depend on the uniqueness and/or confidence level associated with the predefined identifier, and the like. For example a longer time window may be allocated to a predefined identifier that is unique to roundabouts and is detected by a highly reliable sensor. Shorter time window may be allocated to predefined identifiers that are detected by less reliable sensors and/or are detected at bad conditions (for example low visibility) and/or are less unique to the road element.

Step 640 may include searching for potentially relevant objects and/or potentially relevant events that appear in the relevant road related information. A relevant road related information was acquired during at least one relevant time windows.

A potentially relevant event may be a behavior of at least one object. For example—a behavior of the vehicle that senses the road related information, the behavior of one or more other vehicles, the behavior or one or more pedestrians, or a combination of at least two of said behaviors.

A potentially relevant object may be an object that appears in the relevant road related information.

Step 640 may be followed by step 650 of finding actual identifiers of road elements out of the potential identifiers. The findings is based, at least in part, on road related information that was acquired by the vehicles outside the relevant time windows.

The finding may include searching for actual identifiers that will identify (with a first certain probability) road elements of interest (such as roundabouts, crossings and junctions) but not identify (at a second certain probability) road segments that are not interesting.

The finding of the actual identifiers may aim to achieve a desired tradeoff between detection parameters such as false detection rate, positive detection rate, and the like.

Step 650 may include at least one out of:
- Calculating one or more attributes related to the potentially relevant objects.
- Calculating one or more attributes related to the potentially relevant events.
- Calculating one or more attributes related to a group of at least one potentially relevant object and at least one potentially relevant event.
- Determining whether a potential relevant object is an actual identifier based on the value of one or more attributes associated with the potential relevant object.
- Determining whether a potential relevant event is an actual identifier based on the value of one or more attributes associated with the potential relevant event.
- Determining whether a combination of potential relevant objects is an actual identifier based on the value of one or more attributes associated with the combination of potential relevant objects.
- Determining whether a combination of potential relevant events is an actual identifier based on the value of one or more attributes associated with the combination of potential relevant events.
- Determining whether a group of at least one potential relevant event and at least one potential relevant object is an actual identifier based on the value of one or more attributes associated with the group.
- Determining whether a potential relevant object is an actual identifier based on the value of one or more attributes associated with the potential relevant object and one or more attributes related to one or more other potential relevant events and/or one or more attributes related to one or more other potential relevant objects.
- Determining whether a potential relevant event is an actual identifier based on the value of one or more attributes associated with the potential relevant event and one or more attributes related to one or more other potential relevant events and/or one or more attributes related to one or more other potential relevant objects.
- Determining whether a combination of potential relevant objects is an actual identifier based on the value of one or more attributes associated with the combination of potential relevant objects and one or more attributes related to one or more other potential relevant events and/or one or more attributes related to one or more other potential relevant objects.
- Determining whether a combination of potential relevant events is an actual identifier based on the value of one or more attributes associated with the combination of potential relevant events and one or more attributes related to one or more other potential relevant events and/or one or more attributes related to one or more other potential relevant objects.
- Determining whether a group of at least one potential relevant event and at least one potential relevant object is an actual identifier based on the value of one or more attributes associated with the group and one or more attributes related to one or more other potential relevant events and/or one or more attributes related to one or more other potential relevant objects.

An attribute may include, for example, at least one out of:
- A number of appearances of at least one potentially relevant object within one or more relevant time windows.
- A number of appearances of at least one potentially relevant object within one or more sub-sets of one or more relevant time windows.
- A pattern of appearances of at least one potentially relevant object (for example a number of sequences of continuous appearances of at least one potentially relevant object) within one or more relevant time windows.
- A pattern of appearances of at least one potentially relevant object within one or more sub-sets of one or more relevant time windows.
- A number of concurrent appearances of multiple potentially relevant objects within one or more relevant time windows.
- A number of concurrent appearances of multiple potentially relevant objects within one or more sub-sets of one or more relevant time windows.
- A number non-concurrent appearances of multiple potentially relevant objects within one or more relevant time windows.
- A number of non-concurrent appearances of multiple potentially relevant objects within one or more sub-sets of one or more relevant time windows.
- A number of partially concurrent appearances of multiple potentially relevant objects within one or more relevant time windows. Partially concurrent means concurrent appearances (for example at a certain point in time Tx) of two of more potentially relevant objects and an appearance of yet other one or more potentially relevant objects at one or other points in time (that differs from Tx).
- A number of partially concurrent appearances of multiple potentially relevant objects within one or more sub-sets of one or more relevant time windows.
- A number of appearances of at least one potentially relevant event within one or more relevant time windows.
- A number of appearances of at least one potentially relevant event within one or more sub-sets of one or more relevant time windows.
- A pattern of appearances of at least one potentially relevant event (for example a number of sequences of continuous appearances of at least one potentially relevant event) within one or more relevant time windows.

A pattern of appearances of at least one potentially relevant event within one or more sub-sets of one or more relevant time windows.

A number of concurrent appearances of multiple potentially relevant events within one or more relevant time windows.

A number of concurrent appearances of multiple potentially relevant events within one or more sub-sets of one or more relevant time windows.

A number non-concurrent appearances of multiple potentially relevant events within one or more relevant time windows.

A number of non-concurrent appearances of multiple potentially relevant events within one or more sub-sets of one or more relevant time windows.

A number of partially concurrent appearances of multiple potentially relevant events within one or more relevant time windows.

A number of partially concurrent appearances of multiple potentially relevant event within one or more sub-sets of one or more relevant time windows.

A number of concurrent appearances of at least one potentially relevant object and at least one potentially relevant event within one or more relevant time windows.

A number of concurrent appearances of at least one potentially relevant object and at least one potentially relevant event within one or more sub-sets of one or more relevant time windows.

A number non-concurrent appearances of at least one potentially relevant object and at least one potentially relevant event within one or more relevant time windows.

A number of non-concurrent appearances of at least one potentially relevant object and at least one potentially relevant event within one or more sub-sets of one or more relevant time windows.

A number of partially concurrent appearances of at least one potentially relevant object and at least one potentially relevant event within one or more relevant time windows.

A number of partially concurrent appearances at least one potentially relevant object and at least one potentially relevant event within one or more sub-sets of one or more relevant time windows.

It should be noted that the attribute is not limited to numbers or patterns and other attributes may be calculated for example the attribute may be related to location, and/or popularity, and/or frequency, and/or correlation, and/or timing, and the like.

When there are multiple potentially relevant objects then the attribute may be calculated on all possible combinations of any two or more potentially relevant objects of the multiple potentially relevant objects, or on a part of all of the possible combinations.

When there are multiple potentially relevant events then the attribute may be calculated on all possible combinations of any two or more potentially relevant events of the multiple potentially relevant events, or on a part of all of the possible combinations.

When there is a group of at least one potentially relevant object and at least one potentially relevant event then the attribute may be calculated on all possible combinations of any two or more members of the group, or on a part of all of the possible combinations.

Additionally or alternatively, step 650 may include at least one out of

Calculating popularities of the potential identifiers within the relevant time windows.

Calculating popularities of the potential identifiers outside the relevant time windows.

Determining a uniqueness of the different combinations of potential identifiers based on the popularities of the different combinations of potential identifiers within and outside the relevant time windows.

Defining at least one combination of potential identifiers as an actual identifier based on a uniqueness of the at least one combination of potential identifiers.

Performing an unsupervised learning process.

Classifying the actual identifiers to (i) preceding actual identifiers that are detected before reaching the road elements, and (ii) following actual identifiers that are detected after reaching the road elements.

Step 650 may be followed by step 660 of responding to the finding. The responding may include at least one out of (a) transmitting to one or more vehicle the actual identifiers, (b) updating a database of road element identifiers, (c) validating at least one road element identifier, (d) controlling a driving operation of the vehicle based on the finding, and the like.

Step 660 may include updating a data structure of road element identifiers that initially stored the predefined identifiers of road elements, with the actual identifiers of road elements.

Method 600 may be executed by the remote computerized system. Alternatively, method 600 may be executed by system 200. Alternatively, method 200 may be executed in part by a vehicle and in part by the remote computerized system.

Figure 3:
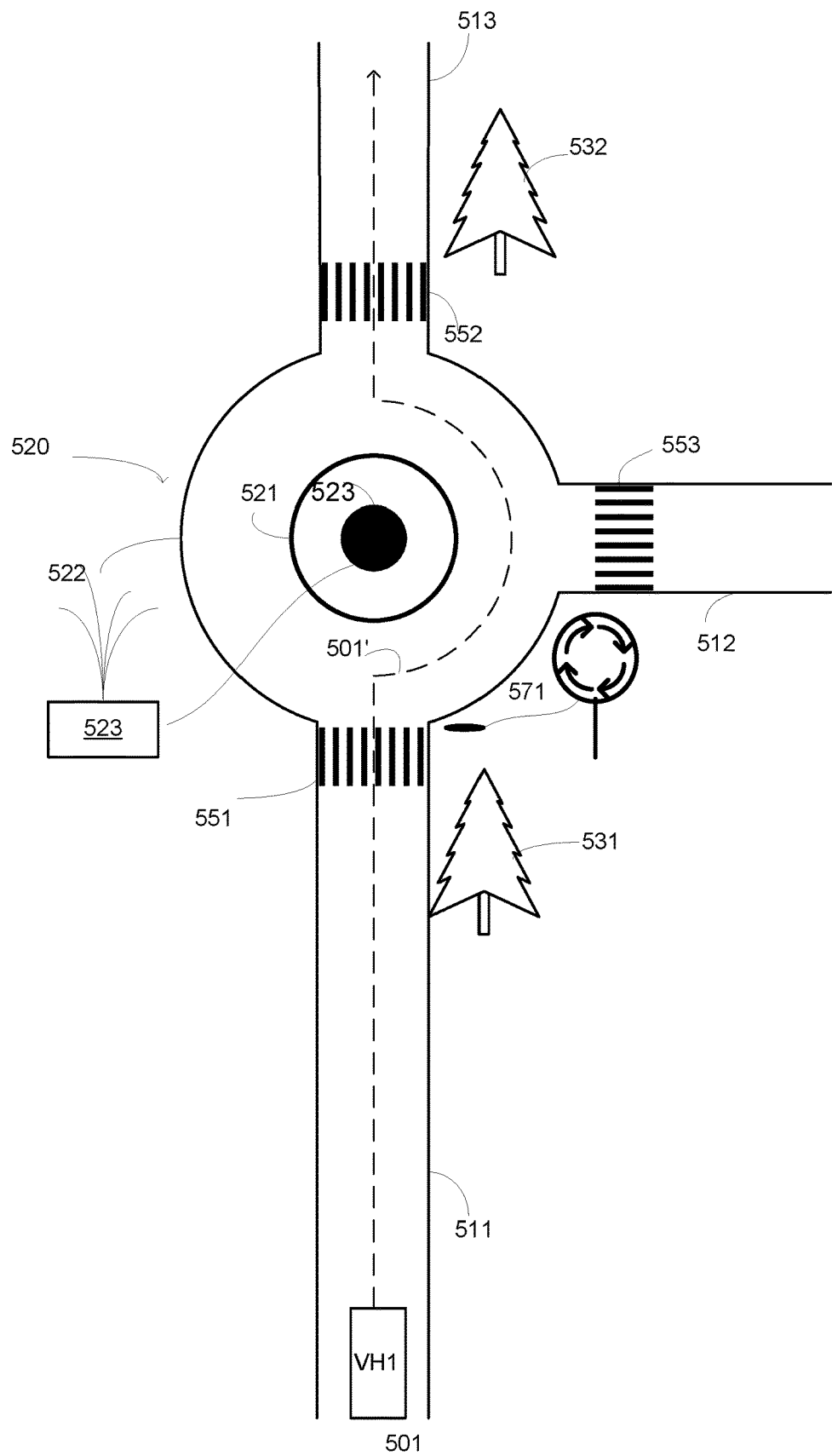
FIG. 3 illustrates an example of a roundabout and its environment.

FIG. 3 illustrates a roundabout 520 that has three arms 511, 512 and 513, and a vehicle VH1 501 that approaches the roundabout (from arm 511), drives within the roundabout and finally exits the roundabout and drives in arm 513. The driving pattern is denoted 501'.

The roundabout is preceded by a roundabout related traffic sign 571 that may be regarded as a predefined identifier of the roundabout.

The vehicle VH1 may acquire road related information while driving. The acquisition may occur regardless of the sensing of the predetermined identifier (the acquisition may be performed in a continuous or non-continuous manner).

The vehicle may first sense the predetermined identifier at an initial point of time—before reaching the roundabout.

The initial point in time may start a relevant time window—or may trigger (after a certain delay) the beginning of the relevant time window. It should be noted that once the predefined identifier is detected the time window may be defined to include points of time that precede the initial point of time.

During the relevant time window the vehicle may acquire road related information while the vehicle approaches the roundabout and/or while driving in the roundabout and/or exiting the roundabout and even at least a predefined period after exiting the roundabout.

The road related information may be processed to detect potential identifiers of the roundabout.

These potential identifiers may include at least out of first tree 531, first cross road 551, second cross road 552, third cross road 553, second tree 532, outer periphery 522 of the roundabout, any feature related to the inner circle of the roundabout such as inner circle border 521, a fountain 523 located at the center of the roundabout, at least a part of the driving pattern 501' (stopping before reaching the roundabout, turning within the roundabout, exiting from the roundabout), or any combinations of said objects and/or behaviors (for example other cars turning, other cars slowing down, pedestrians wait and then cross). The relationships (spatial and/or timing relationships) between objects and/or events may also be taken into account-such as the distances between the cross roads and their relative orientations). Yet another example of a potential identifier may include tire skid marks at the roundabout—for example on the periphery of the inner circle of the roundabout.

Some of these potential identifiers (such as outer periphery 522 of the roundabout) may be deemed as actual identifiers while others (such as first tree 531 and second tree 532, asphalt sections that may appear in each image) may be rejected. The trees are not unique to roundabouts and may be found in road related information obtained outside the relevant time window.

Figure 4:
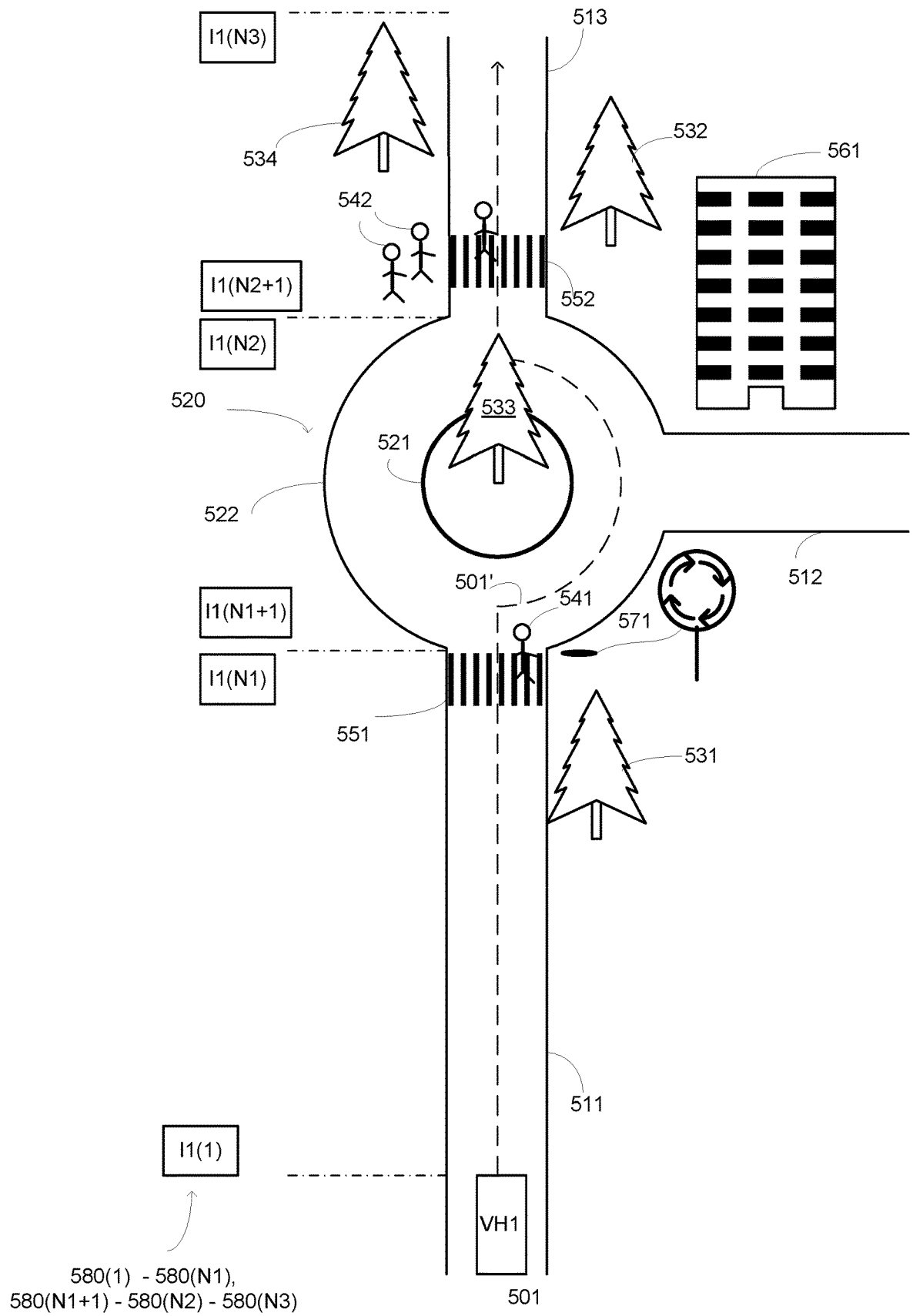
FIG. 4 illustrates an example of a roundabout and its environment.

FIG. 4 illustrates a roundabout 520 that has three arms 511, 512 and 512 and a vehicle VH1 501 that approaches the roundabout (from arm 511), drives within the roundabout and finally exits the roundabout and drives in arm 513. The driving pattern is denoted 501'.

The roundabout is preceded by a roundabout related traffic sign 571 that may be regarded as a predefined identifier of the roundabout.

The potential identifiers may include at least out of first tree 531, second tree 532, forth tree 534, building 561, first pedestrian 541, second pedestrians 542, first cross road 551, second cross road 552, third cross road 553, outer periphery 522 of the roundabout, any feature related to the inner circle of the roundabout such as inner circle border 521, a third tree 533 (located at the center of the roundabout), at least a part of the driving pattern 501' (stopping before reaching the roundabout, turning within the roundabout, exiting from the roundabout), or any combinations of said objects and/or behaviors. For example an potential identifier may be related to a behavior of one or more pedestrians out of first pedestrian 541 and second pedestrians 542.

The relationships (spatial and/or timing relationships) between objects and/or events may also be taken into account—such as the distances between the cross roads and their relative orientations).

Some of these potential identifiers (such as outer periphery 522 of the roundabout) may be deemed as actual identifiers while others (such as first tree 531 and second tree 532, forth tree 532, building 561, pedestrians, asphalt sections that may appear in each image) may be rejected. The trees are not unique to roundabouts and may be found in road related information obtained outside the relevant time window.

FIG. 4 illustrates that the vehicle acquires images—(a) N1 images I1(1)-I1(N1) 580(1)-580(N1) before reaching the roundabout, (b) (N2−N1) images I1(N1+1)-I1(N2) 580(N1+1)-580(N2) while driving in the roundabout, and (c) (N3−N2) images I1(N2+1)-I1(N3) 580(N2+1)-580(N3) after exiting the roundabout.

Images I1(1)-I1(N2) may be acquired during a relevant time window.

Images I1(1)-I1(N1) are acquired before entering the roundabout and may be used for predicting an arrival of the vehicle to the roundabout.

Images I1(1)-I1(N1) are acquired when driving in the roundabout and can be used to verify the prediction.

Figure 5:
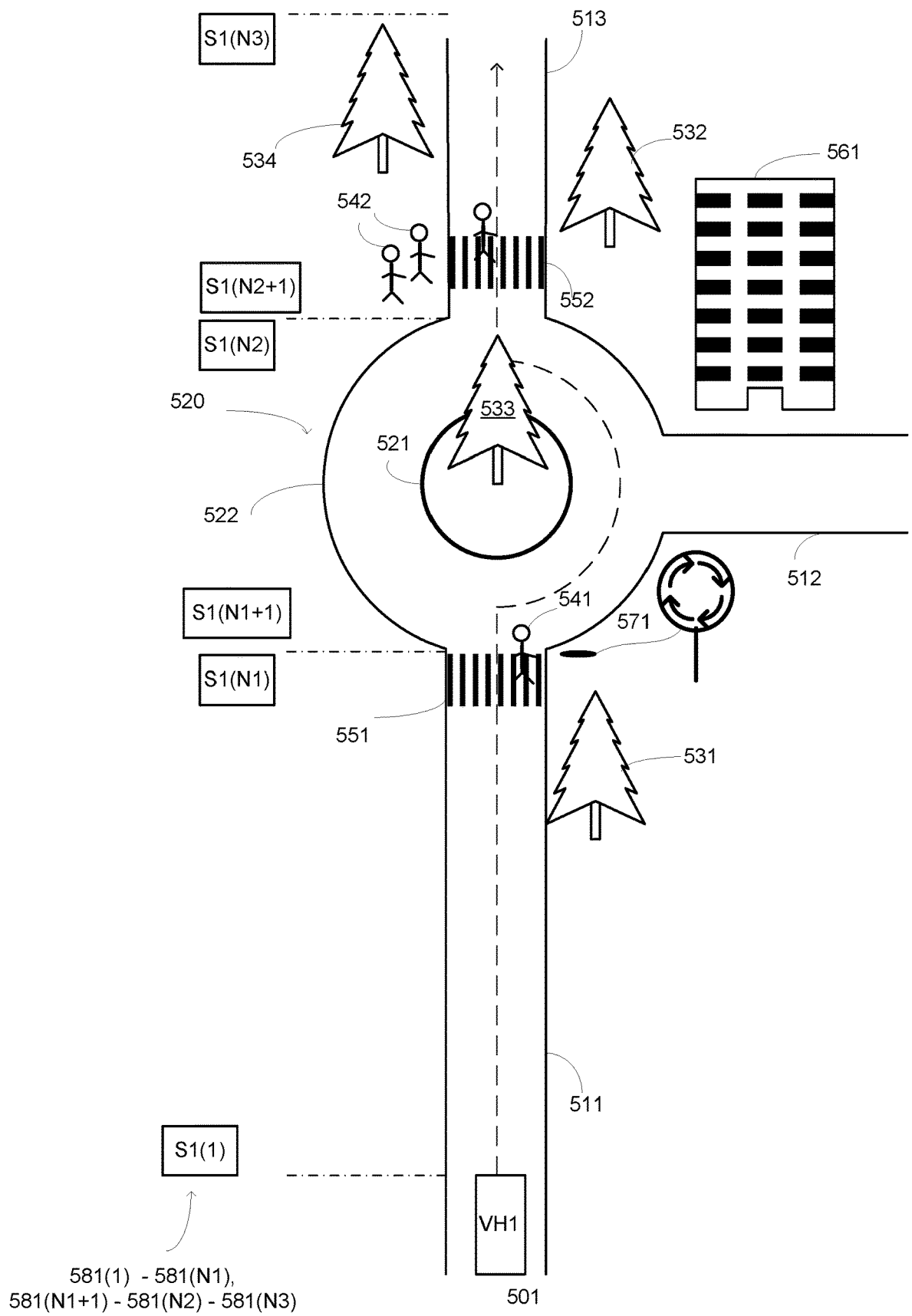
FIG. 5 illustrates an example of a roundabout and its environment.

FIG. 5 illustrates a roundabout 520 that has three arms 511, 512 and 512 and a vehicle VH1 501 that approaches the roundabout (from arm 511), drives within the roundabout and finally exits the roundabout and drives in arm 513. The driving pattern is denoted 501'.

FIG. 5 illustrates that the vehicle acquires sensed information—(a) N1 sensed information S1(1)-S1(N1) 581(1)-581(N1) before reaching the roundabout, (b) (N2−N1) sensed information S1(N1+1)-S1(N2) 581(N1+1)-581(N2) while driving in the roundabout, and (c) (N3−N2) sensed information S1(N2+1)-S1(N3) 581(N2+1)-581(N3) after exiting the roundabout.

Sensed information S1(1)-S1(N2) may be acquired during a relevant time window.

Sensed information S1(1)-S1(N1) are acquired before entering the roundabout and may be used for predicting an arrival of the vehicle to the roundabout.

Sensed information S1(1)-1(N1) are acquired when driving in the roundabout and can be used to verify the prediction.

The sensed information may be visual information, may be audio information, may be non-visual and non-audio information, or be combination of information of various types—for example a combination of audio and video, a combination of acceleration and/or speed and/or telemetry readings, and the like.

Figure 6:
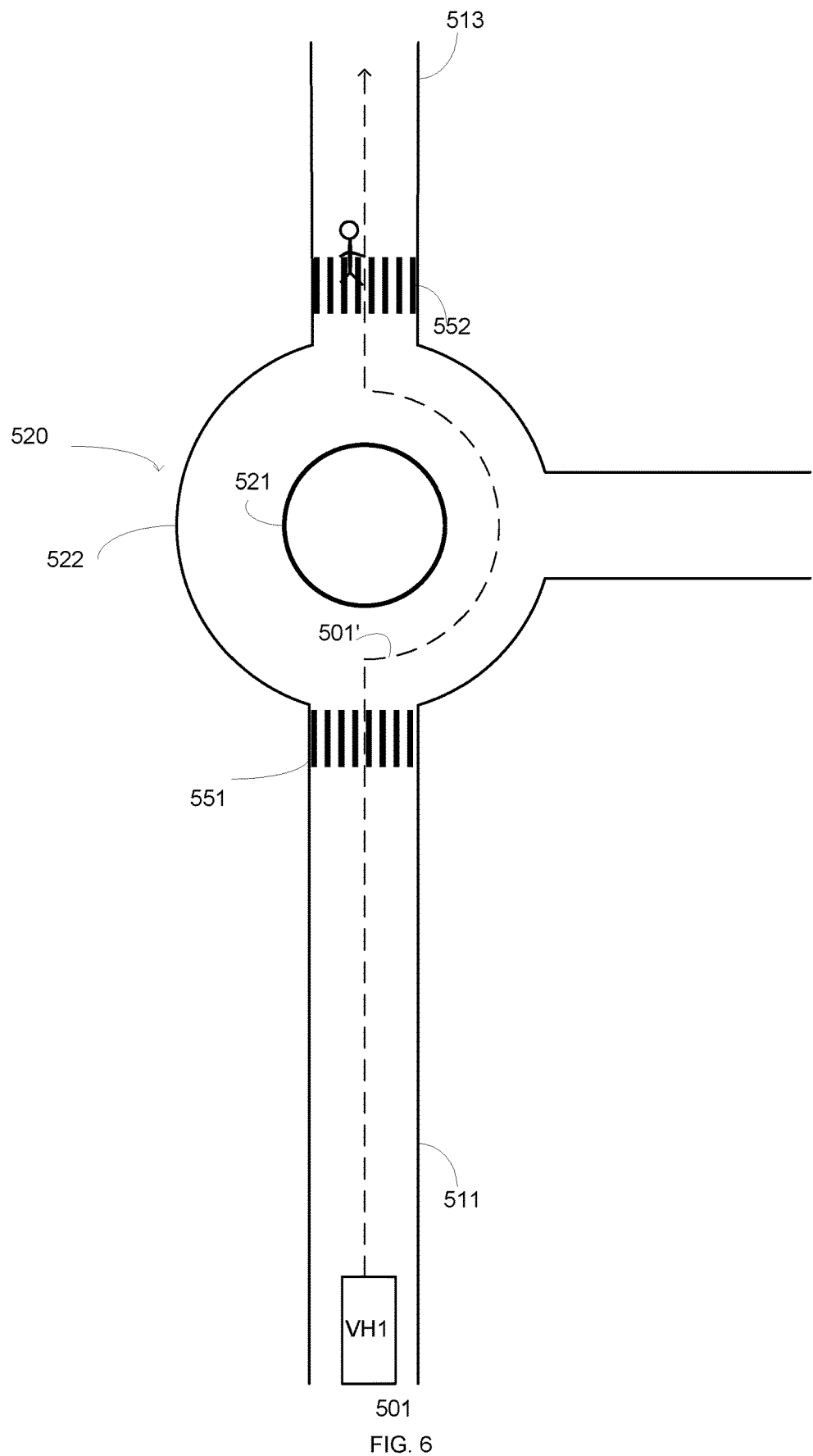
FIG. 6 illustrates an example of a roundabout and its environment.

FIG. 6 illustrates a roundabout 520 that has three arms 511, 512 and 512 and a vehicle VH1 501 that approaches the roundabout (from arm 511), drives within the roundabout and finally exits the roundabout and drives in arm 513. The driving pattern is denoted 501'.

The roundabout is not preceded by a roundabout related traffic sign 571 that may be regarded as a predefined identifier of the roundabout.

Despite the absence of the predefined identifier—the roundabout may be detected based on actual identifiers such as (a) outer periphery 522 of the roundabout, (b) any feature related to the inner circle of the roundabout such as inner circle border 521, (c) at least a part of the driving pattern 501' (stopping before reaching the roundabout, turning within the roundabout, exiting from the roundabout), or any combinations of said objects and/or behaviors.

Figure 7:
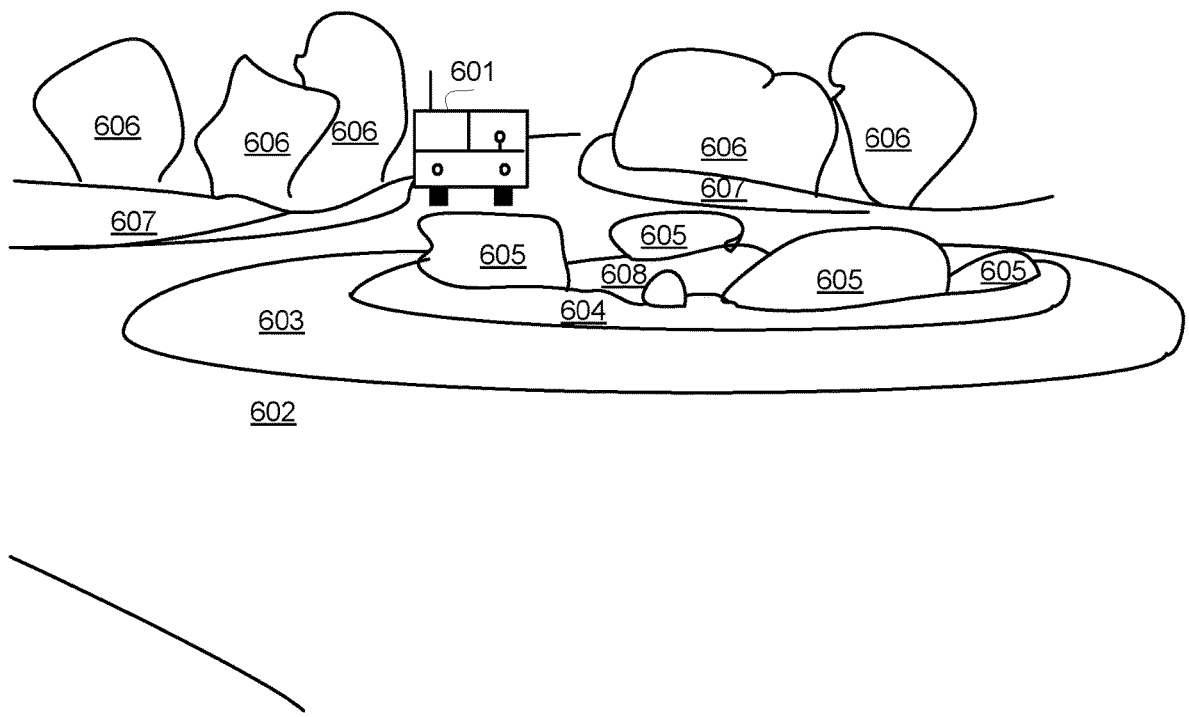
FIG. 7 illustrates an example of an image of a roundabout and its environment.

FIG. 7 illustrates an image acquired by a vehicle that entered a roundabout.

The image include a curved road 502 within the roundabout, an ring shaped zone 603 that surrounds the inner circle 604 of the roundabout, sand 608 and few bushes or plants 605 located in the inner circle 604, various trees 606 that surround the roundabout, a pavement 605 that surrounds the roundabout, and a vehicle 601 that is about to enter the roundabout.

Even at the absence of a roundabout related traffic sign the vehicle may detect the roundabout based on actual identifier such as the curved road 502 within the roundabout, the ring shaped zone 603 that surrounds the inner circle 604 of the roundabout, a driving pattern of the vehicle that acquired the image when entering the roundabout and/when turning in the roundabout, and the like.

Figure 8:
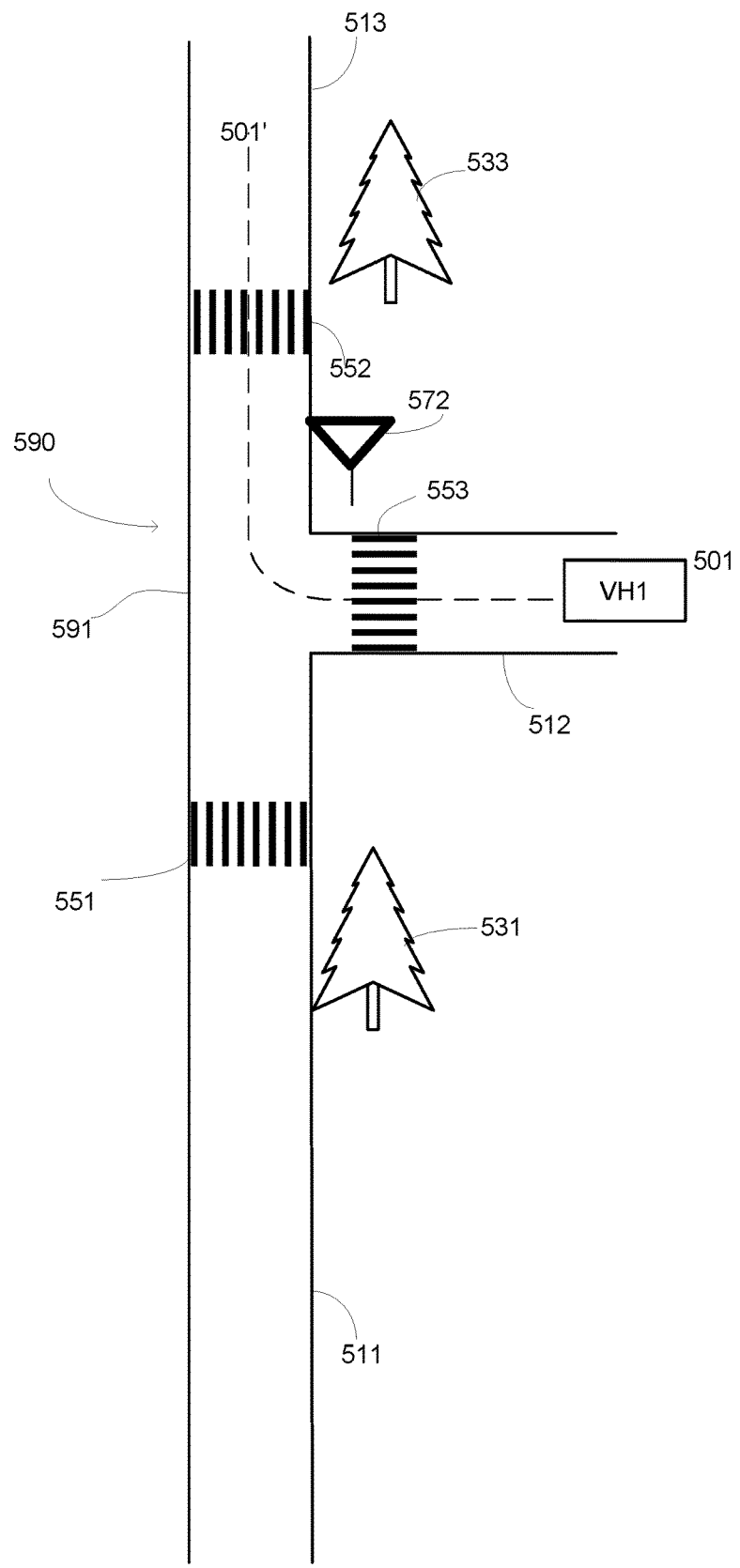
FIG. 8 illustrates an example of a junction and its environment.

FIG. 8 illustrates a T-junction 590 that has three arms 511, 512 and 512 and a vehicle VH1 501 that approaches the junction (from arm 512), enters the junction and turns to the right- to arm 512, and drives in arm 513. The driving pattern is denoted 501'.

The junction is preceded by a junction related traffic sign 572 that may be regarded as a predefined identifier of the junction.

The vehicle VH1 may acquire road related information while driving.

The vehicle may first sense the predetermined identifier at an initial point of time—before reaching the junction. The initial point in time may start a relevant time window—or may trigger (after a certain delay) the beginning of the relevant time window.

During the relevant time window the vehicle may acquire road related information while the vehicle approaches the junction and/or while driving in the junction and/or exiting the junction and even at least a predefined period after exiting the junction.

The road related information may be processed to detect potential identifiers of the junction.

These potential identifiers may include at least out of first tree 531, first cross road 551, second cross road 552, third cross road 553, third tree 533, edge 591 of the junction that faces arm 512, at least a part of the driving pattern 501' (stopping before reaching the junction, turning within the junction, exiting from the junction), or any combinations of said objects and/or behaviors. The relationships (spatial and/or timing relationships) between objects and/or events may also be taken into account-such as the distances between the cross roads and their relative orientations).

Some of these potential identifiers (such as edge 591) may be deemed as actual identifiers while others (such as first tree 531 and third tree 533, asphalt sections that may appear in each image) may be rejected. The trees are not unique to junctions and may be found in road related information obtained outside the relevant time window.

Figure 9:
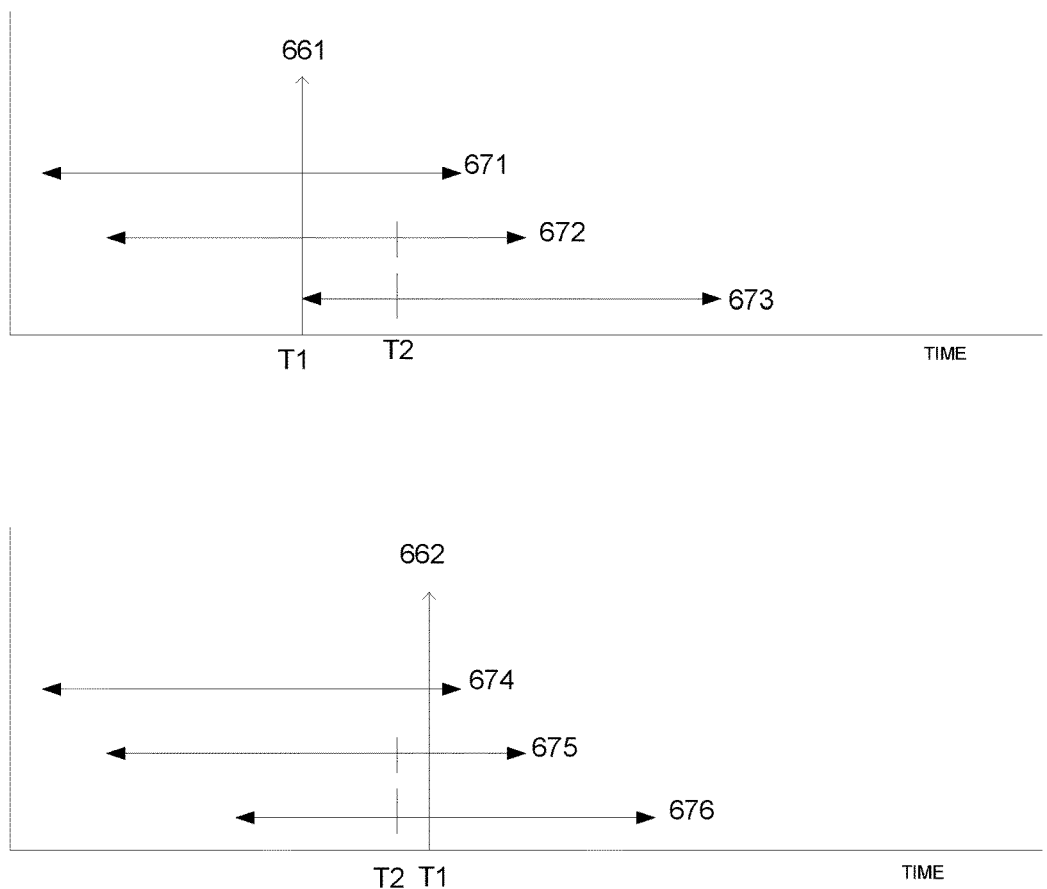
FIG. 9 illustrates an example of timing diagrams.

Various predefined identifiers as well as actual identifiers may be used. Road related information FIG. 9 illustrates examples of timing diagrams.

Event 661 represents a sensing of a predefined identifier by a vehicle. The sensing occurred at point of time T1. Various relevant time windows 671, 672 and 673 may be defined—all including T1. T2 represents an estimated moment of reaching the road element identified by the predefined identifier.

Event 662 represents a sensing of a predefined identifier by a vehicle. The sensing occurred at point of time T1. Various relevant time windows 674, 675 and 676 may be defined—all including T1. T2 represents an estimated moment of reaching the road element identified by the predefined identifier.

Event 661 is expected to occur before reaching the road element while event 662 is expected to occur after reaching the road element.

Any time window may be of any length, any timing relationships may exist from any time window and the sensing of the predefined event.

There may be provided a method for driving an autonomous vehicle, the method may include:
 a. Sensing by a vehicle road related information that is indicative of predefined identifiers of road elements.
 b. Transmitting the road related information to a computerized system such as remote computerized system located outside the vehicle and/or to a computer located in the vehicle.
 c. Receiving actual identifiers of the road elements.
 d. Sensing new (new—sensed after step C) road related information by the vehicle.
 e. Searching in the new road related information for at least one of the actual identifiers.
 f. Detecting a road element identified by at least one of the actual identifiers.
 g. Performing a driving related operation based on the detection of the road element.

The terms "including", "comprising", "having", "consisting" and "consisting essentially of" are used in an interchangeable manner. For example—any method may include at least the steps included in the figures and/or in the specification, only the steps included in the figures and/or the specification. The same applies to the system and the mobile computer.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one as or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements the mere fact that certain measures are recited in mutually different claims does not indicate that a combination of these measures cannot be used to advantage.

Any system, apparatus or device referred to this patent application includes at least one hardware component.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

Any combination of any component of any component and/or unit of system that is illustrated in any of the figures and/or specification and/or the claims may be provided.

Any combination of any system illustrated in any of the figures and/or specification and/or the claims may be provided.

Any combination of any set of pool cleaning robots illustrated in any of the figures and/or specification and/or the claims may be provided.

Any combination of steps, operations and/or methods illustrated in any of the figures and/or specification and/or the claims may be provided.

Any combination of operations illustrated in any of the figures and/or specification and/or the claims may be provided.

Any combination of methods illustrated in any of the figures and/or specification and/or the claims may be provided.

We claim:

1. A method for detecting road elements, the method comprises:
    detecting predefined identifiers of road elements, in road related information sensed by vehicles;
    detecting potential identifiers of road elements that differ from the predefined identifiers of road elements, by processing road related information that was acquired by the vehicles during relevant time windows that are related to the detecting of the predefined identifiers;
    finding actual identifiers of road elements out of the potential identifiers; wherein the finding is based, at least in part, on road related information that was acquired by the vehicles outside the relevant time windows; and
    updating a database with the actual identifiers.

2. The method according to claim 1 wherein the finding of the actual identifiers is responsive to (a) popularities of the potential identifiers within the relevant time windows and (b) popularities of the potential identifiers outside the relevant time windows.

3. The method according to claim 1 wherein the finding of the actual identifiers comprises (a) calculating popularities of different combinations of potential identifiers within the relevant time windows; (b) calculating popularities of the different combinations of potential identifiers outside the relevant time windows; (c) determining a uniqueness of the different combinations of potential identifiers based on the popularities of the different combinations of potential identifiers within and outside the relevant time windows, (d) and defining at least one combination of potential identifiers as an actual identifier based on a uniqueness of the at least one combination of potential identifiers.

4. The method according to claim 1 comprising generating the predefined identifiers of road elements by performing a supervised learning process.

5. The method according to claim 1 wherein the steps of (a) detecting of the potential identifiers, and (b) finding actual identifiers, are included in a unsupervised learning process.

6. The method according to claim 1 wherein the actual identifiers identify corresponding road elements, wherein the method comprising classifying the actual identifiers to (i) preceding actual identifiers that appear in the road related information before predefined identifiers of their corresponding road elements, and (ii) following actual identifiers that appear in the road related information after the predefined identifiers of their corresponding road elements.

7. The method according to claim 6 comprising predicting an arrival of a vehicle to a road element of a certain type based on at least one preceding actual identifier associated with the certain type of road element.

8. The method according to claim 6 comprising verifying an arrival of a vehicle to a road element of a certain type based on at least one following actual identifier associated with the certain type of road element.

9. The method according to claim 1 comprising updating a data structure of road element identifiers that initially stored the predefined identifiers of road elements, with the actual identifiers of road elements.

10. The method according to claim 1 wherein at least one actual identifier is a visual actual identifier.

11. The method according to claim 1 wherein at least one actual identifier is an audio actual identifier.

12. The method according to claim 1 wherein at least one actual identifier is a non-visual and non-audio actual identifier.

13. The method according to claim 1 wherein at least one actual identifier is an accelerometer.

14. The method according to claim 1 wherein at least one actual identifier represents an object.

15. The method according to claim 1 wherein at least one actual identifier represents a behavior of an object.

16. The method according to claim 1 wherein each potential identifier comprises a label that identifies the potential identifier.

17. The method according to claim 16, wherein the finding of the actual identifiers is responsive to (a) popularity of the label within the relevant time windows and (b) a popularity of the label outside the relevant time windows.

18. The method according to claim 1 comprising transmitting, to one or more vehicles the actual identifiers.

19. A method for detecting road elements, the method comprises: detecting predefined identifiers of road elements, in road related information sensed by at least one vehicle; detecting potential identifiers of road elements that differ from the predefined identifiers of road elements, by processing road related information that was acquired by the at least one vehicle during relevant time windows that are related to the detecting of the predefined identifiers; finding actual identifiers of road elements out of the potential identifiers; wherein the finding is based, at least in part, on road related information that was acquired by the at least one vehicle outside the relevant time windows; and updating a database with the actual identifiers.

20. A non-transitory computer readable medium that stores instructions that once executed by a computerized system causes the computerized system to detect road elements, by:
  detecting predefined identifiers of road elements, in road related information sensed by vehicles;
  detecting potential identifiers of road elements that differ from the predefined identifiers of road elements, by processing road related information that was acquired by the vehicles during relevant time windows that are related to the detecting of the predefined identifiers;
  finding actual identifiers of road elements out of the potential identifiers; wherein the finding is based, at least in part, on road related information that was acquired by the vehicles outside the relevant time windows; and
  updating a database with the actual identifiers.

21. The non-transitory computer readable medium according to claim 20 wherein the finding of the actual identifiers is responsive to (a) popularities of the potential identifiers within the relevant time windows and (b) popularities of the potential identifiers outside the relevant time windows.

22. The non-transitory computer readable medium according to claim 20 wherein the finding of the actual identifiers comprises (a) calculating popularities of different combinations of potential identifiers within the relevant time windows; (b) calculating popularities of the different combinations of potential identifiers outside the relevant time windows; (c) determining a uniqueness of the different combinations of potential identifiers based on the popularities of the different combinations of potential identifiers within and outside the relevant time windows, (d) and defining at least one combination of potential identifiers as an actual identifier based on a uniqueness of the at least one combination of potential identifiers.

23. The non-transitory computer readable medium according to claim 20 that stores instructions for generating the predefined identifiers of road elements by performing a supervised learning process.

24. The non-transitory computer readable medium according to claim 20 wherein the steps of (a) detecting of the potential identifiers, and (b) finding actual identifiers, are included in an unsupervised learning process.

25. The non-transitory computer readable medium according to claim 20 wherein the actual identifiers identify corresponding road elements, wherein the non-transitory computer readable medium stores instructions for classifying the actual identifiers to (i) preceding actual identifiers that appear in the road related information before predefined identifiers of their corresponding road elements, and (ii) following actual identifiers that appear in the road related information after the predefined identifiers of their corresponding road elements.

26. The non-transitory computer readable medium according to claim 25 that stores instructions for predicting an arrival of a vehicle to a road element of a certain type based on at least one preceding actual identifier associated with the certain type of road element.

27. The non-transitory computer readable medium according to claim 25 that stores instructions for verifying an arrival of a vehicle to a road element of a certain type based on at least one following actual identifier associated with the certain type of road element.

28. The non-transitory computer readable medium according to claim 20 that stores instructions for updating a data structure of road element identifiers that initially stored the predefined identifiers of road elements, with the actual identifiers of road elements.

29. The non-transitory computer readable medium according to claim 20 wherein at least one actual identifier is a visual actual identifier.

* * * * *